United States Patent
McKillen et al.

(10) Patent No.: US 10,351,181 B2
(45) Date of Patent: Jul. 16, 2019

(54) APPARATUS AND METHODS FOR MANIPULATING AIRFLOW AROUND AND THROUGH A VEHICLE

(71) Applicant: Honda Motor Co., Ltd., Tokyo (JP)

(72) Inventors: James T. McKillen, Marysville, OH (US); Michael R. Missig, Columbus, OH (US); Matthew Vernon Roehl, Columbus, OH (US); Yasuyuki Onishi, Dublin, OH (US); Kenichi Teshima, Raymond, OH (US); Fabian J. Vigil, Columbus, OH (US); Aron K. Madsen, Marysville, OH (US); Kurtis Ray Horner, Marysville, OH (US); Mayur A. Agrawal, Marysville, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 316 days.

(21) Appl. No.: 15/073,568

(22) Filed: Mar. 17, 2016

(65) Prior Publication Data
US 2016/0272257 A1  Sep. 22, 2016

Related U.S. Application Data

(60) Provisional application No. 62/135,081, filed on Mar. 18, 2015.

(51) Int. Cl.
*B62D 35/00* (2006.01)
*B62D 35/02* (2006.01)
*B60K 11/08* (2006.01)

(52) U.S. Cl.
CPC ............ *B62D 35/005* (2013.01); *B60K 11/08* (2013.01); *B62D 35/00* (2013.01); *B62D 35/02* (2013.01); *Y02T 10/82* (2013.01); *Y02T 10/88* (2013.01)

(58) Field of Classification Search
CPC .... B62D 35/00; B62D 35/005; B62D 35/007; B62D 35/008
See application file for complete search history.

(56) References Cited

U.S. PATENT DOCUMENTS

| 2,585,220 | A | * | 2/1952 | Brezek | B60K 11/08 180/68.1 |
| 2,731,098 | A | * | 1/1956 | Saives | B60K 11/08 180/68.1 |
| 2,886,120 | A | * | 5/1959 | Broell | B60S 1/62 180/309 |
| 4,267,895 | A | * | 5/1981 | Eggert, Jr. | B60K 1/04 180/291 |

(Continued)

*Primary Examiner* — Jacob B Meyer
(74) *Attorney, Agent, or Firm* — Kenealy Vaidya LLP

(57) ABSTRACT

An aerodynamic system for a vehicle having a plurality of heat exchangers can include a front assembly, a pair of front fenders, a hood, a ducting assembly, and a rear assembly. The front assembly can include air inlets. The air inlets can be in fluid communication with at least one of the heat exchangers. The pair of front fenders can include fender outlets in fluid communication with at least one of the heat exchangers. The ducting assembly can be in fluid communication with at least one of the plurality of heat exchangers. The rear assembly can include raised C-pillars, air inlets adjacent the pair of raised C-pillars, a rear spoiler, a rear diffuser, and rear slot assemblies adjacent the rear spoiler.

11 Claims, 31 Drawing Sheets

(56) References Cited

U.S. PATENT DOCUMENTS

| | | | | |
|---|---|---|---|---|
| 4,384,630 | A * | 5/1983 | Steiner | B62D 35/00 180/7.1 |
| 4,441,752 | A * | 4/1984 | Buehrig | B60J 1/2008 296/180.1 |
| 4,455,045 | A * | 6/1984 | Wheeler | B62D 35/00 105/1.2 |
| 4,460,055 | A * | 7/1984 | Steiner | B62D 35/00 180/7.1 |
| 4,690,204 | A * | 9/1987 | Reichel | F01P 11/10 123/41.62 |
| 5,184,832 | A * | 2/1993 | Miwa | B62D 35/005 280/848 |
| 5,346,274 | A * | 9/1994 | Syamal | B60R 19/00 296/180.1 |
| 5,490,572 | A * | 2/1996 | Tajiri | B60H 1/00278 180/65.1 |
| 6,230,836 | B1 * | 5/2001 | Cowan | B62D 21/10 180/118 |
| 6,354,003 | B1 * | 3/2002 | Lehmann | B29C 44/12 29/460 |
| 6,685,256 | B1 * | 2/2004 | Shermer | B60J 5/108 296/180.1 |
| 6,742,831 | B2 * | 6/2004 | Rees | B62D 35/007 180/903 |
| 7,000,719 | B2 * | 2/2006 | Ceccarani | B60K 13/02 180/68.1 |
| 7,152,908 | B2 * | 12/2006 | Shahbazi | B62D 35/00 296/180.1 |
| 7,156,453 | B2 * | 1/2007 | Shahbazi | B62D 35/00 296/180.1 |
| 7,163,073 | B2 * | 1/2007 | Schmid | B60K 11/08 180/68.1 |
| 7,165,804 | B2 * | 1/2007 | Shahbazi | B62D 35/00 296/180.1 |
| 7,185,944 | B2 * | 3/2007 | Shahbazi | B62D 35/00 296/180.1 |
| 7,226,117 | B2 * | 6/2007 | Preiss | B62D 35/007 296/180.1 |
| 7,237,827 | B2 * | 7/2007 | Shahbazi | B62D 35/00 296/180.1 |
| 7,364,220 | B2 * | 4/2008 | Shahbazi | B62D 35/00 296/180.1 |
| 7,665,798 | B2 * | 2/2010 | Hsia | B62D 35/00 114/271 |
| 7,695,050 | B2 * | 4/2010 | Neale | B62D 35/00 180/903 |
| 7,905,307 | B2 * | 3/2011 | Kubota | B60K 1/04 165/202 |
| 8,007,037 | B2 * | 8/2011 | Wolkersdorfer | B60K 11/08 296/209 |
| 8,172,307 | B2 * | 5/2012 | Froeschle | B60J 1/2008 180/903 |
| 8,196,996 | B1 * | 6/2012 | Campbell | B62D 35/001 296/180.1 |
| 8,297,393 | B2 * | 10/2012 | Froeschle | B60J 1/2008 180/68.1 |
| 8,454,083 | B2 * | 6/2013 | Dimitriou | B62D 35/00 296/193.06 |
| 8,602,485 | B2 * | 12/2013 | Maertz | B62D 35/001 296/180.1 |
| 8,651,211 | B2 * | 2/2014 | Wolf | B62D 35/007 180/68.1 |
| 8,701,811 | B2 * | 4/2014 | Robinson | B60K 11/06 180/68.2 |
| 8,870,266 | B2 * | 10/2014 | Iinuma | B60Q 1/0017 296/181.5 |
| 8,955,628 | B2 * | 2/2015 | Murray | B60K 11/08 180/68.1 |
| 9,162,641 | B2 * | 10/2015 | Townson | B62D 25/084 |
| 9,580,118 | B2 * | 2/2017 | Cardile | B62D 35/007 |
| 9,610,984 | B2 * | 4/2017 | Koremoto | B60J 5/0415 |
| 9,637,185 | B2 * | 5/2017 | Kishima | B62D 25/08 |
| 9,643,665 | B2 * | 5/2017 | Hommes | B62D 35/00 |
| 9,662,967 | B2 * | 5/2017 | Rutschmann | B60K 13/02 |
| 9,975,585 | B2 * | 5/2018 | Auden | G07C 5/08 |
| 2002/0153178 | A1 * | 10/2002 | Limonius | B60L 8/00 180/2.2 |
| 2009/0140543 | A1 * | 6/2009 | Caldirola | B60K 11/08 296/180.5 |
| 2011/0000727 | A1 * | 1/2011 | Froeschle | B60J 1/2008 180/68.1 |
| 2011/0001329 | A1 * | 1/2011 | Froeschle | B60J 1/2008 296/76 |
| 2011/0198885 | A1 * | 8/2011 | Ilse | B62D 35/008 296/180.5 |
| 2013/0062132 | A1 * | 3/2013 | Wolf | B62D 35/007 180/68.1 |
| 2013/0284530 | A1 * | 10/2013 | Robinson | B60K 11/06 180/68.4 |
| 2014/0132033 | A1 * | 5/2014 | Townson | B62D 25/084 296/193.1 |
| 2015/0345578 | A1 * | 12/2015 | Nightingale | B60K 11/085 188/264 AA |
| 2016/0039479 | A1 * | 2/2016 | Kishima | B62D 25/08 296/181.5 |
| 2016/0144905 | A1 * | 5/2016 | Nishiura | B62D 35/008 296/180.1 |
| 2016/0244106 | A1 * | 8/2016 | Cardile | B62D 35/007 |
| 2016/0272257 | A1 * | 9/2016 | McKillen | B62D 35/005 |
| 2017/0057566 | A1 * | 3/2017 | Hommes | B62D 35/00 |
| 2017/0225623 | A1 * | 8/2017 | Gaylard | B60R 3/02 |
| 2017/0240221 | A1 * | 8/2017 | Gaylard | B62D 35/005 |
| 2017/0240222 | A1 * | 8/2017 | Gaylard | B62D 35/005 |
| 2017/0240223 | A1 * | 8/2017 | Gaylard | B62D 35/005 |
| 2017/0240224 | A1 * | 8/2017 | Gaylard | B62D 35/005 |
| 2017/0240226 | A1 * | 8/2017 | Brooks | B62D 35/007 |
| 2018/0154951 | A1 * | 6/2018 | Schmidt | B62D 35/001 |
| 2018/0170456 | A1 * | 6/2018 | Schroeck | B62D 35/008 |

\* cited by examiner

APPARATUS AND METHODS FOR MANIPULATING AIRFLOW AROUND AND THROUGH A VEHICLE

CROSS REFERENCE TO RELATED APPLICATIONS

This application is non-provisional of U.S. Provisional Patent Application No. 62/135,081, filed on Mar. 18, 2015, the contents of which is hereby incorporated by reference in its entirety.

BACKGROUND

The disclosed subject matter relates to vehicle structures and systems for manipulating airflow around a vehicle, and methods of use and manufacture thereof. More particularly, the disclosed subject matter relates to methods and apparatus for manipulating airflow entering and exiting various portions of a vehicle.

Aerodynamic performance can be a critical design parameter for a vehicle, such as but not limited to a purpose-built racing vehicle, which is intended to operate primarily at or near the performance limit on a closed circuit course. Aerodynamic performance for such a racing vehicle can involve a compromise between enhancing or maximizing aerodynamic downforce and reducing or minimizing aerodynamic drag. Aerodynamic downforce can be the sole factor in the final shape of the body of a racing car. Racing cars can also include special devices, such as wings, diffusers, turning vanes, etc., to provide additional downforce.

SUMMARY

A road-going vehicle can be designed to be as aerodynamically efficient as possible, while also meeting other standards not required of racing cars. However, enhancing or maximizing aerodynamic downforce for a road-going vehicle can adversely impact the aesthetic appeal for the road-going vehicle. Further, aerodynamic drag increases with increasing aerodynamic downforce, and aerodynamic drag can increase fuel consumption of the road-going vehicle. In addition, airflow requirements for at least one system and/or component (such as but not limited to a heat exchanger) of a road-going vehicle while travelling at relatively low speeds can outweigh any advantage obtained from aerodynamic downforce.

Thus, it can be challenging to design a high-performance road-going vehicle that can be driven in stop-and-go traffic, and that can also adequately perform on a closed-circuit racing course, while also providing an appropriate level of safety and aesthetic appeal.

It may therefore be beneficial to provide a vehicle with structures and systems that address at least one of the above and/or other disadvantages of the related art. In particular, it may be beneficial to provide aerodynamics to direct airflow to enhance vehicle performance.

Some embodiments are therefore directed to an aerodynamic system for a vehicle having a plurality of heat exchangers. The system can include a front assembly, a pair of front fenders, a hood, a ducting assembly, and a rear assembly. The front assembly can include a pair of lateral air inlets. The lateral air inlets can be in fluid communication with at least one of the heat exchangers. The pair of front fenders can include a respective one of a pair of fender outlets in fluid communication with at least one of the heat exchangers. The hood can span between the pair of front fenders and above at least one of the plurality of heat exchangers. The ducting assembly can be in fluid communication with at least one of the plurality of heat exchangers. The rear assembly can be spaced from the front assembly. The rear assembly can include a pair of raised C-pillars providing an air passage, a pair of air inlets adjacent the pair of raised C-pillars, a rear spoiler, and a rear diffuser.

Some other embodiments are directed to an aerodynamic system for a vehicle including a ducting assembly. The aerodynamic system can include a front assembly spaced forward of the vehicle. The aerodynamic system can also include a pair of raised C-pillars spaced rearwardly from the front assembly, each of the C-pillars defining an air passage. The aerodynamic system can further include a rear assembly spaced rearwardly from the pair of raised C-pillars including an air inlet adjacent each of the pair of raised C-pillars, a rear spoiler, and a pair of rear slot assemblies adjacent the rear spoiler, the air inlets and the pair of rear slot assemblies configured to be in fluid communication with the ducting assembly.

Still other embodiments are directed to a method of forming an aerodynamic system for a vehicle including a ducting assembly. The method can include: installing a front assembly so as to be spaced forward of the roof; forming a pair of raised C-pillars rearward of the front assembly, each of the C-pillars defining an air passage; and disposing a rear assembly rearwardly from the pair of raised C-pillars including an air inlet adjacent each of the pair of raised C-pillars, a rear spoiler, and a pair of rear slot assemblies adjacent the rear spoiler, the air inlets and the pair of rear slot assemblies configured to be in fluid communication with the ducting assembly.

DETAILED DESCRIPTION OF EXEMPLARY EMBODIMENTS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

Figure 1:
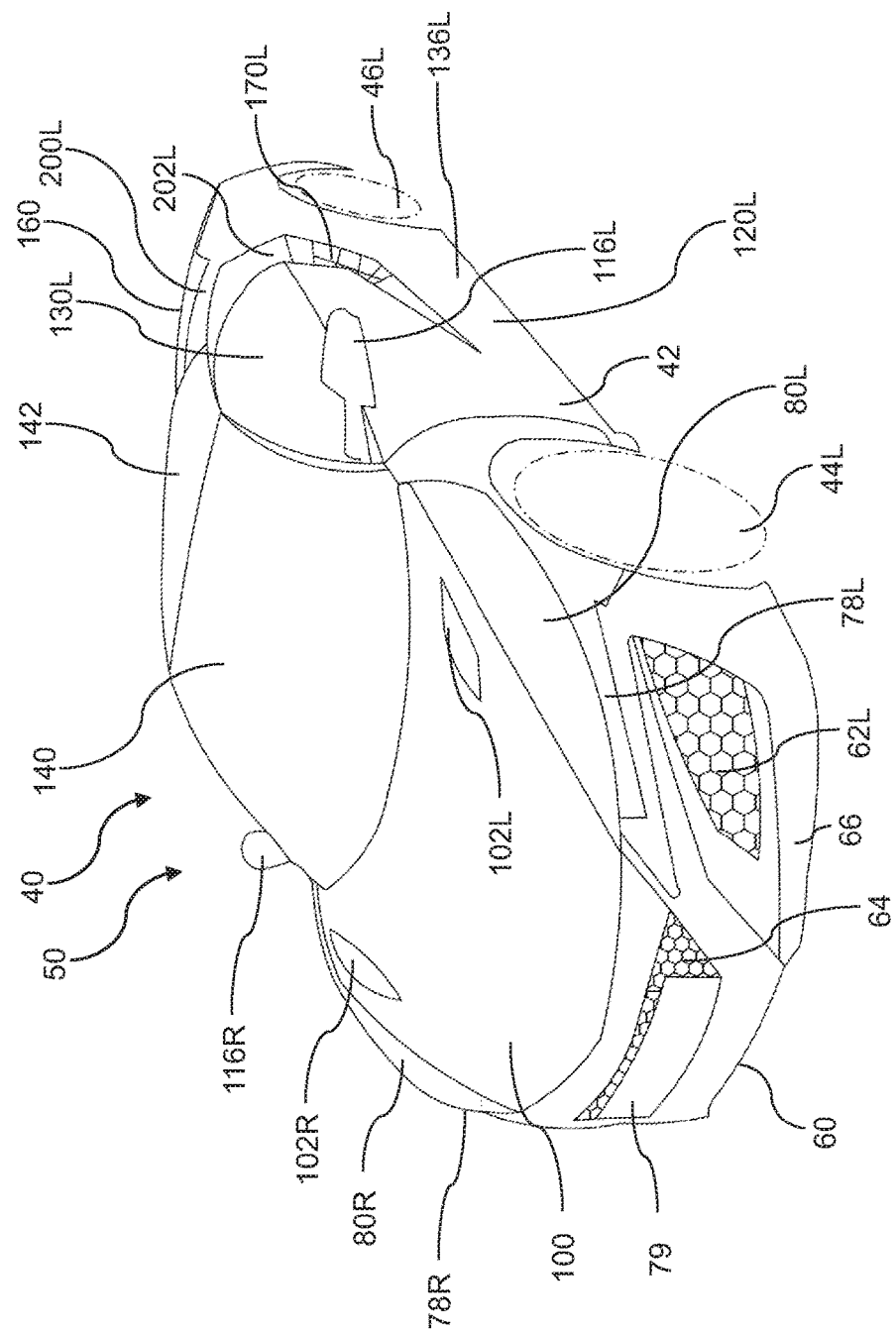
FIG. 1 is a perspective view of an exemplary vehicle having an aerodynamic system in accordance with the disclosed subject matter.

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Certain embodiments of a vehicle 40 having an aerodynamic system 50 are disclosed below, and FIGS. 1-31 illustrate some of these embodiments. However, embodiments are intended to include or otherwise cover many different embodiments and structures for improving aerodynamics of the vehicle 40.

Various headings are provided below for convenience and clarity. However, these headings are not intended to limit the scope or content of the disclosure, and/or the scope of protection afforded the various inventive concepts disclosed herein.

As shown in FIGS. 1-31 and described below, a high-performance road-going vehicle can be configured as a mid-engine vehicle, such that the internal combustion engine is mounted at a location of the vehicle that is between the front axle and the rear axle. In this engine configuration, the engine compartment of a mid-engine vehicle does not meet the air head-on. The vehicle can be shaped so that air flows smoothly across the body, and also accesses the inlets and vents that direct air to the engine, heat exchanger(s), brakes, and other appropriate system(s) or component(s) of the vehicle. The inlets and vents should not create turbulence, and should easily allow the air to flow freely, both in and out of the engine room, and other appropriate portion(s) of the vehicle, without creating turbulence (or with reduced turbulence) that can be detrimental to vehicle when driven at speed or on a closed-circuit racing course.

Providing a smooth airflow inside the vehicle can be advantageous for extracting enhanced or maximum performance for a high-performance vehicle's engine. Additionally, providing a smooth airflow to other component(s) and/or system(s) can be advantageous for enhancing or maximizing the overall performance of the vehicle. The component(s) and/or system(s) can include but are not limited to an internal combustion engine, an electric drive motor, a turbocharger, a supercharger, a multiple speed-ratio transmission, and at least one air cooled heat exchanger. Aerodynamic incorporation of the system(s) and/or component(s) can greatly influence the overall performance of a high-performance vehicle.

As discussed above, a high-performance vehicle traveling at relative high speeds can generate aerodynamic force(s) directed to lift the vehicle upwardly from the surface of travel and/or aerodynamic force(s) directed to push the vehicle downward toward the surface of travel, and/or aerodynamic force(s) directed to resist motion of the vehicle through the air. The aerodynamic force(s) can be in a range from insignificant to substantial. Additionally, the aerodynamic force(s) can be distributed evenly or unevenly across the length and width of the vehicle. Based on predetermined target(s) for the vehicle's performance with regard to limit driving (such as but not limited to terminal speed, maximum lateral acceleration, elapsed time to accelerate from rest to a predetermined speed, etc.), the aerodynamic force(s) the vehicle generates at speed as well as the front-to-rear distribution of these aerodynamic force(s) can be influential in meeting the predetermined vehicle performance target(s). A high-performance road-going vehicle can be designed to generate a total aerodynamic downforce that exceeds any or all of the aerodynamic lift force(s). A net aerodynamic downforce can permit the high-performance road-going vehicle to be stable and safe for all operating conditions. However, this stability and safety can lead to the detriment of lap times on a closed-circuit racing course due to a possible increase in aerodynamic drag. Further optimization of a safe and stable base vehicle can enhance or improve the performance to meet additional targets, such as lap time and track performance targets. For example, the aerodynamic drag of the vehicle can be reduced or optimized. Controlling the amount of aerodynamic drag can be advantageous in achieving enhanced or maximum speed targets of the original performance target requirements.

Also shown in FIGS. 1-31 and described below, the vehicle can include a plurality of passive aerodynamic structures and systems. Please note, active aerodynamic structures and systems are also contemplated while keeping the breadth and scope of the present disclosure. Exemplary embodiments of aerodynamic structures and systems can include but are not limited to a pair of raised C-pillars, air inlets adjacent the raised C-pillars, a plurality of fascia air inlets, a plurality of fascia outlets, a chin spoiler, a pair of fender outlets, a pair of hood outlets, a ducting assembly, a rear spoiler, a rear diffuser and a pair of rear slot assemblies.

In some embodiments, the raised C-pillars can be connected at one end to the roof panel and connected at the other end to the rear fender. The portion between the two ends of the raised C-pillar can cooperate with the bodywork and/or glass underneath the C-pillars to form a passage through which air can flow. In other words, the raised C-pillars can be configured to resemble a flying-buttress when viewed on edge.

While the subject matter has been described in detail with reference to exemplary embodiments thereof, it will be apparent to one skilled in the art that various changes can be made, and equivalents employed, without departing from the scope of the invention. All related art references discussed in the above Description of the Related Art section are hereby incorporated by reference in their entirety.

I. Overall Vehicle

FIG. 1 is a perspective view of an exemplary vehicle having an aerodynamic system in accordance with the disclosed subject matter. The vehicle 40 shown in FIG. 1 is primarily for use on paved roadways, and can be referred to as a passenger vehicle. Specifically, the vehicle 40 can be configured as a racecar designed for operation on a closed circuit course. However, in some instances, the vehicle 40 may also be for use on unpaved roadways consisting of gravel, dirt, sand, etc.

Thus, the disclosed aerodynamic system 50 can be used with any vehicle that is configured for travel along any one or combination of improved, unimproved, and unmarked roadways and paths consisting of gravel, dirt, sand, etc. For example, embodiments are intended to include or otherwise cover any type of automobile, including racing car, passenger car, minivan, truck, etc. In fact, embodiments are intended to include or otherwise cover configurations of the aerodynamic system 50 for use in any other type of vehicle, such as an aircraft, boat, ship, train, spacecraft, etc. Some other embodiments can be used in non-vehicular applications, such as for amusement park rides, or any other situation where a vessel can be exposed to airflow through which the vessel maneuvers.

The vehicle 40 can include a body 42, a pair of front wheels 44L,R (the right-side front wheel 44R is obstructed from view), a pair of rear wheels 46L,R (the right-side rear wheel 46R is obstructed from view), a front assembly 60, a pair of front fenders 80L,R (the right-side front fender 80R is obstructed from view), a hood 100, a pair of doors 120L,R (the right-side door 120R is obstructed from view) having respective door windows 130L,R (the right-side door window 130R is obstructed from view), a windshield 140, a roof 142, a rear assembly 160, a frame assembly, and a powertrain. The frame assembly and the powertrain are omitted from FIG. 1 for simplicity and clarity of the drawings. The vehicle 40 can also be configured to include an aerodynamic system integrated within some of the aforementioned vehicle components.

The vehicle 40 can additionally be configured to include headlights 78L,R at corners of the front assembly 60 and a license plate frame 79 disposed thereon. Side mirrors 116L,R can extend from A-pillars, and side sills 136L,R (the right-side side sill 136R is obstructed from view) can extend along bottom portions of the respective doors 120L,R.

II. Aerodynamic System

The aerodynamic system 50 integrated within the vehicle 40 can include at least one of the front assembly 60, the pair of front fenders 80L,R, the hood 100, a ducting assembly 180, a pair of C-pillars 200L,R, and the rear assembly 160.

The front assembly 60 can be configured as a front bumper assembly, and can include a pair of lateral air inlets 62L,R and a central air inlet 64 disposed therebetween. The front assembly 60 can additionally include a chin spoiler 66 extending from a lower portion thereof, and a pair of wheel arch outlets 68L,R disposed along rearward sides of the front assembly 60 at portions corresponding to respective wheel arches. As will be described below, the pair of lateral air inlets 62L,R, the central air inlet 64, and the wheel arch outlets 68L,R can be configured to be in fluid communication with at least one of the heat exchangers 52 via the ducting assembly 180 of the vehicle 40.

The pair of front fenders 80L,R can be disposed between the front assembly 60 and the doors 120L,R, extending around the front wheels 44L,R to form wheel arches with rearward sides of the front assembly 60. As will be described below, the pair of front fenders 80L,R can include a pair of respective fender outlets 90L,R configured to be in fluid communication with at least one of the heat exchangers 52 via the ducting assembly 180 of the vehicle 40.

The hood 100 can extend span between the pair of front fenders 80L,R approximately from the front assembly 60 to the windshield 140 above at least one of the heat exchangers 52. The hood 100 can also cover a portion of the body 42 containing at least part of the powertrain of the vehicle 40 or alternatively configured as storage space. As will be described below, a pair of hood outlets 102L,R can be disposed in opposing portions of the hood 100 proximate the respective pair of front fenders 80L,R, the hood outlets 102L,R configured to be in fluid communication with at least one of the heat exchangers 52 via the ducting assembly 180 of the vehicle 40.

The ducting assembly 180, as described above, can extend within portions of the body 42 to connect various components of the aerodynamic system 50 so as to be in fluid communication, and particularly to connect at least some of those components with the heat exchangers 52.

The pair of C-pillars 200L,R can be disposed rearward of the front assembly 60 so as to extend from the roof 142 to the rear assembly 160. The pair of C-pillars 200L,R extend proximate rear portions of the doors 120L,R, and in the present embodiment, can be raised away from the doors 120L,R so as to define an air passage between the rear portion of each of the doors 120L,R and the respective C-pillar 200L,R. The C-pillars 200L,R thereby define respective C-pillar openings 202L,R. As will be described below, the pair of C-pillars 200L,R can be configured to be in fluid communication with at least one of the heat exchangers 52 via the ducting assembly 180 of the vehicle 40, and may additionally provide improved aerodynamic performance.

The rear assembly 160 can extend rearward from the C-pillars 200L,R and include a pair of rear air inlets 170L,R adjacent the pair of C-pillars 200L,R. The rear air inlets 170L,R can be positioned below the respective C-pillar openings 202L,R, and as will be described below, can be configured to be in fluid communication with at least one of the heat exchangers 52 via the ducting assembly 180 of the vehicle 40, and may additionally provide improved aerodynamic performance. The rear assembly 160 can further include a rear spoiler 165 at an upper portion and a rear diffuser 175 at a lower portion. As will be described below, the rear spoiler 165 and the rear diffuser 175 can be configured to provide improved aerodynamic performance of the vehicle 40. The rear assembly 160 can also include a pair of taillights 161L,R and a pair of rear slot assemblies 162L,R adjacent the taillights 161L,R. As will be described below, pair of rear slot assemblies 162L,R adjacent the taillights 161L,R can be configured to be in fluid communication with at least one of the heat exchangers 52 via the ducting assembly 180, and may also provide improved aerodynamic performance of the vehicle 40.

A. C-Pillars

Figure 2:
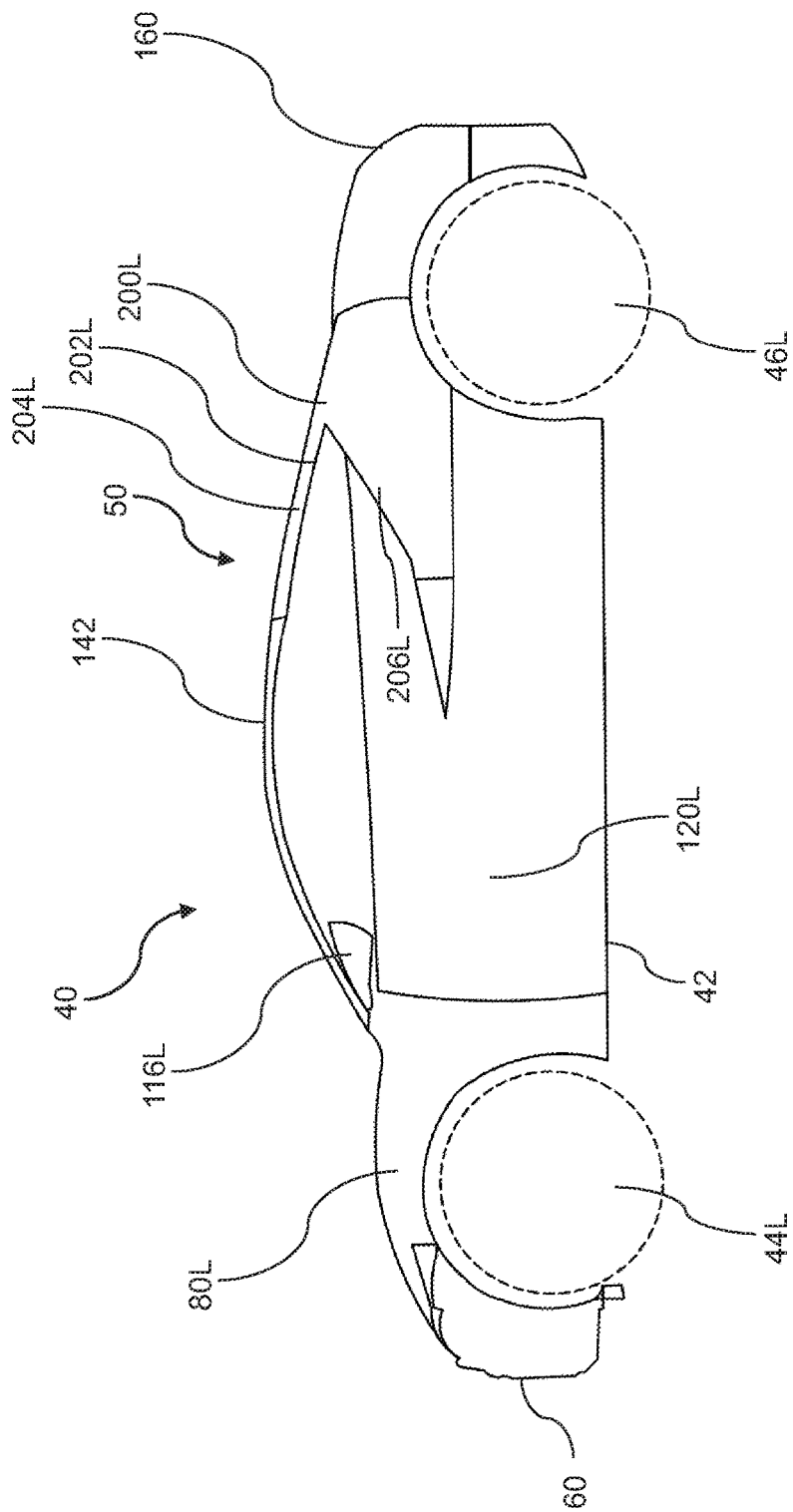
FIG. 2 is a perspective view of a left-side of the exemplary vehicle having the aerodynamic system.

FIG. 2 is a perspective view of a left-side of the exemplary vehicle 40 having the aerodynamic system 50. The aerodynamic system 50 shown in FIG. 2 includes the pair of raised C-pillars 200L,R extending from the roof 142 to the rear assembly 160, the C-pillars 200L,R being raised to define respective air passages at the C-pillar openings 202L,R.

The pair of C-pillars 200L,R in the present embodiment are each comprised of an upper pillar portion 204L,R extending from respective sides of the roof 142 joined with lower pillar portions 206L,R extending from respective sides of the rear assembly 160. Thus, both the upper and lower pillar portions 204L,R, 206L,R are configured as ends of the respective C-pillars 200L,R by which the C-pillars 200L,R are connected to the body 42. Intermediate portions between the respective upper and lower pillar portions 204L,R, 206L,R are thereby raised from the body 42 so as to form air passages between the body 42 and the C-pillars 200L,R, the intermediate portions being connected to the body 42 by the respective upper and lower pillar portions 204L,R, 206L,R.

B. Rear Assembly

Figure 3:
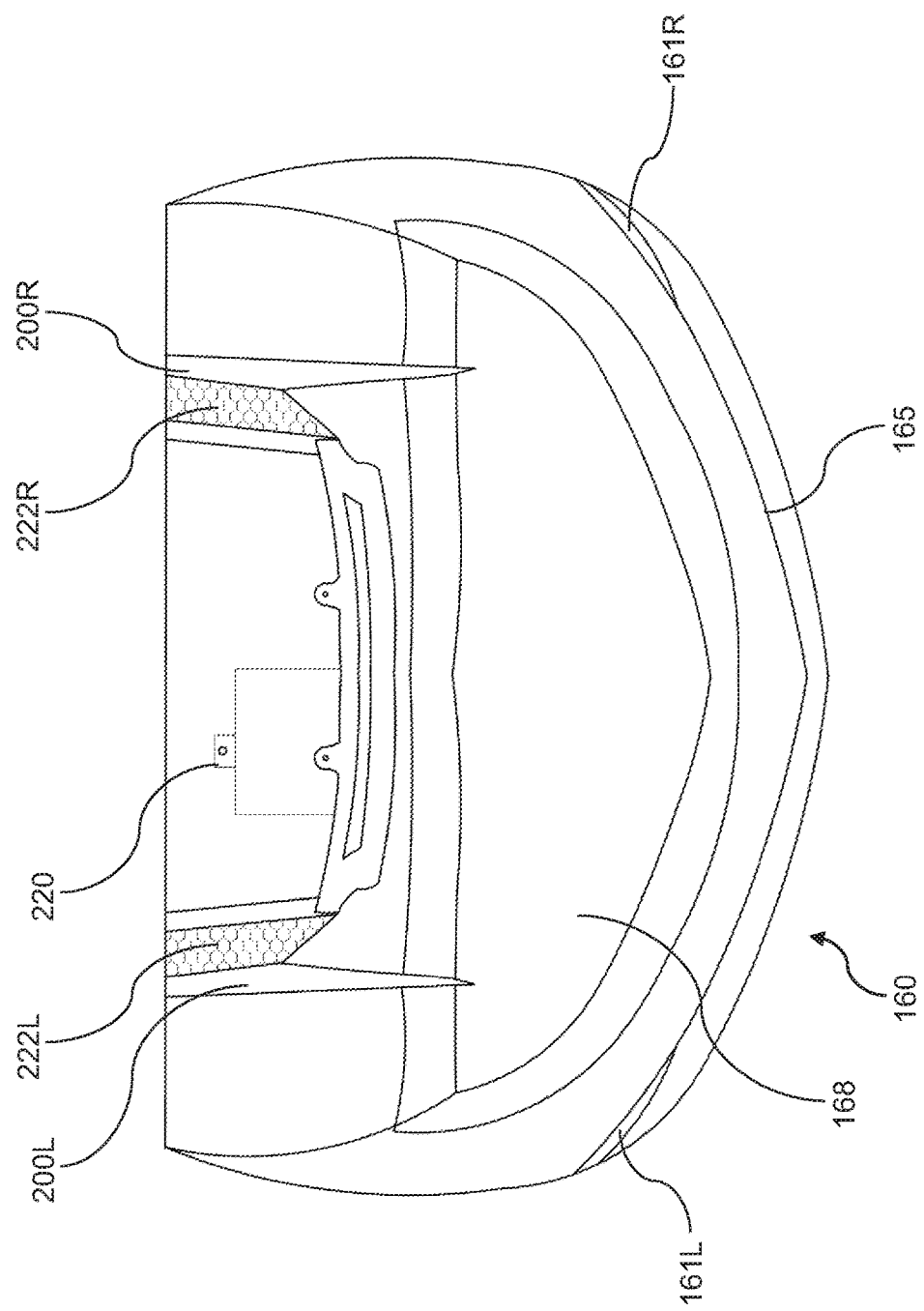
FIG. 3 is a perspective view from above the rear assembly of the vehicle.

FIG. 3 is a perspective view from above the rear assembly 160 of the vehicle 40. The rear assembly 160 shown in FIG. 3 is connected to rear portions of the C-pillars 200L,R, the rear portions of the C-pillars 200L,R extending to a decklid 168 on which the rear spoiler 165 is disposed.

The rear assembly 160 can also be adjacent an engine bay 220 disposed between the pair of C-pillars 200L,R, the engine bay 220 having a pair of engine vents 222L,R extending along sides thereof. The engine vents 222L,R are therefore also adjacent the respective C-pillars 200L,R and may cooperate with the air passages through the C-pillar openings 202L,R to provide improved aerodynamic performance of the vehicle. Particularly, the engine vents 222L,R and the C-pillars 200L,R can direct airflow onto the decklid 168 and the rear spoiler 165.

The pair of raised C-pillars 200L,R and can generate a plurality of vortices. While vortices can positively influence reduction in rear lift, such vortices can also increase drag. Thus, shapes of the C-pillars are configured in part to reduce strength of the vortices and associated drag. The shapes permitted air flowing under the C-pillars 200L,R at a relatively high velocity. This serves to reduce intensity of the vortex on a rear side of each of the C-pillars 200L,R, provide substantial cooling air to the engine bay 220 via the rear air inlets 170L,R located under the C-pillars 200L,R, and provide additional pressure differential over the engine vents 222L,R located on either side of the engine bay 220. Vortices coming off of the C-pillars 200L,R additionally increase the amount of airflow introduced to the engine bay 220 at a base thereof (forward of the decklid 168). In addition to vortices caused by the C-pillar 200L,R, additional vortices can be generated because of a shape of the decklid 168. An angle of the decklid 168 relative to a direction of airflow can thereby induce rotation. Relieving base pressure in this area by forming openings above the taillights 161L,R, as will be described below, can serve to control the above described flow structure. Thus, this pressure manipulation reduces both drag and lift on the vehicle 40.

Figure 4:
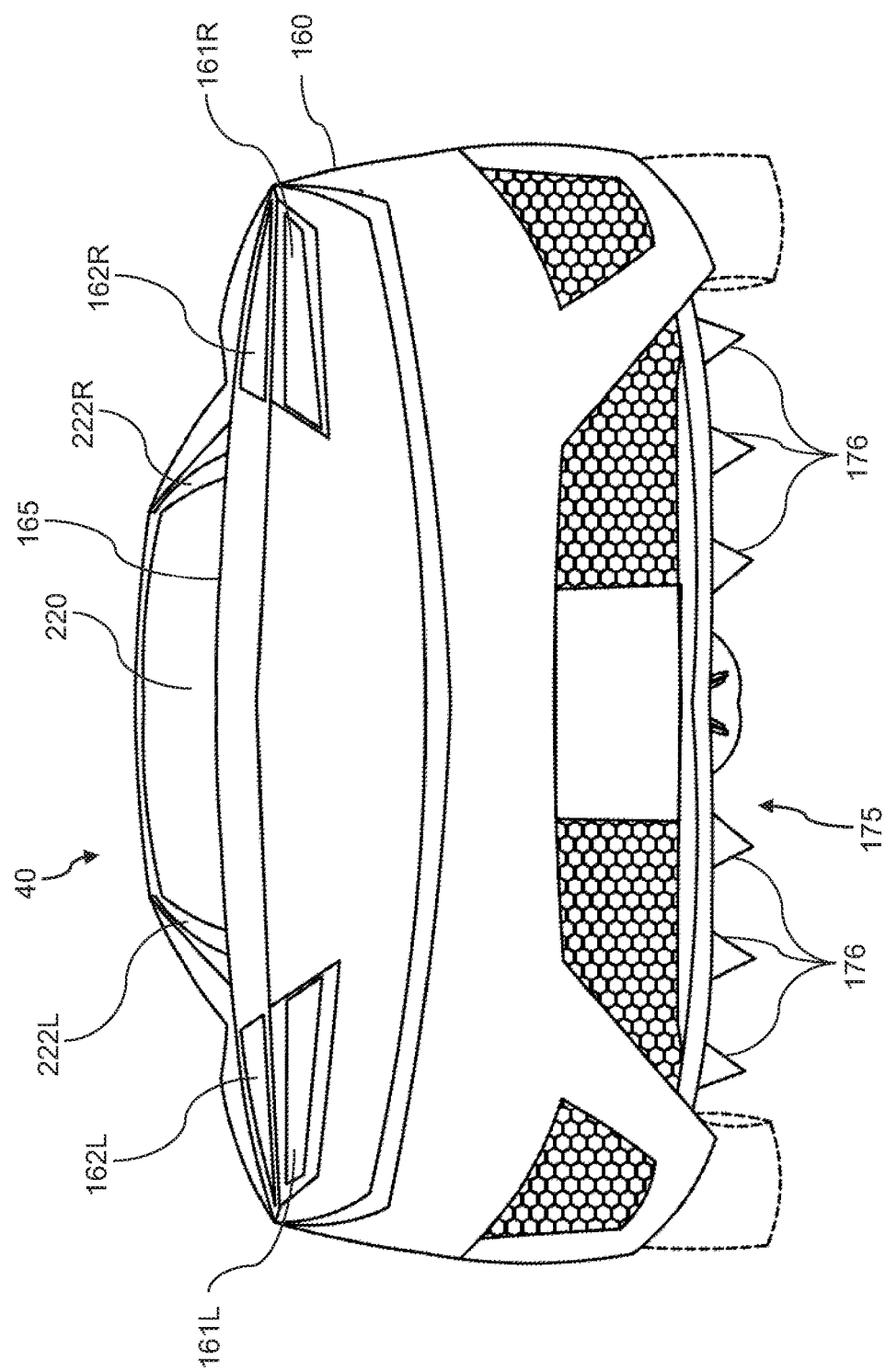
FIG. 4 is a perspective view of the rear of the vehicle including the rear assembly.

FIG. 4 is a perspective view of the rear of the vehicle 40 including the rear assembly 160. The rear assembly 160 shown in FIG. 4 can be configured to include the rear slot assemblies 162L,R disposed adjacent the taillights 161L,R.

The rear slot assemblies 162L,R of the present embodiment can be disposed above the taillights 161L,R so as to extend along a direction of elongation of the taillights 161L,R. The rear slot assemblies 162L,R can further be disposed to extend through the rear spoiler 165 such that the rear slot assemblies 162L,R are configured as air outlets for the ducting assembly 180 in a rear face of the rear assembly 160. The rear slot assemblies 162L,R configured as openings above the respective taillights 161L,R were added to help control base pressure and reduce vortices generated due to shapes of the C-pillars 200L,R and the decklid 168, as well as the hatch angle of an exterior surface of the engine bay 220.

The rear assembly 160 in FIG. 4 can also include the rear diffuser 175 extending along a lower portion thereof. The rear diffuser 175 can include vanes 176 for guiding airflow to the rear of the vehicle 40. As will be described below, the rear diffuser 175 can be configured to provide improved aerodynamic performance of the vehicle 40.

Figure 5:
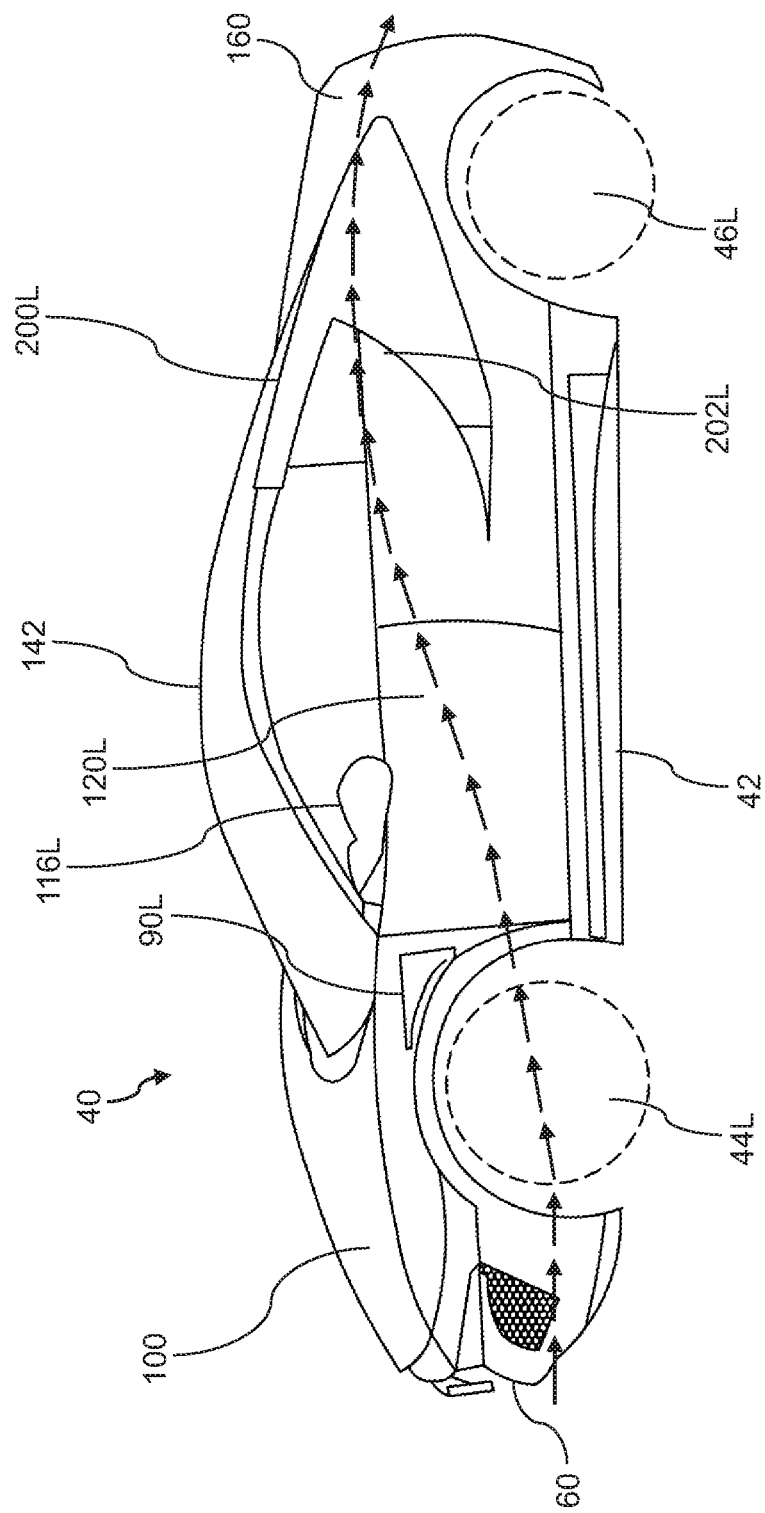
FIG. 5 is a perspective view of a left-side of the exemplary vehicle having the aerodynamic system.

FIG. 5 is a perspective view of a left-side of the exemplary vehicle 40 having the aerodynamic system 50. The aerodynamic system 50 can be configured to guide airflow through and around the vehicle 40. Specifically, the aerodynamic system 50 can guide airflow through at least one of the ducting assembly 180 and the C-pillars 200L,R to provide improved aerodynamic performance of the vehicle 40.

The present embodiment shown in FIG. 5 can also include the pair of fender outlets 90L,R in the respective front fenders 80L,R. The fender outlets 90L,R can be disposed aft of the front assembly 60 along upper portions of the respective wheel arches. The fender outlets 90L,R can be configured to be in fluid communication with at least one of the heat exchangers 52 via the ducting assembly 180 of the vehicle 40 such that the fender outlets 90L,R vent airflow along sides of the body 42 for improved aerodynamic performance.

Figure 6:
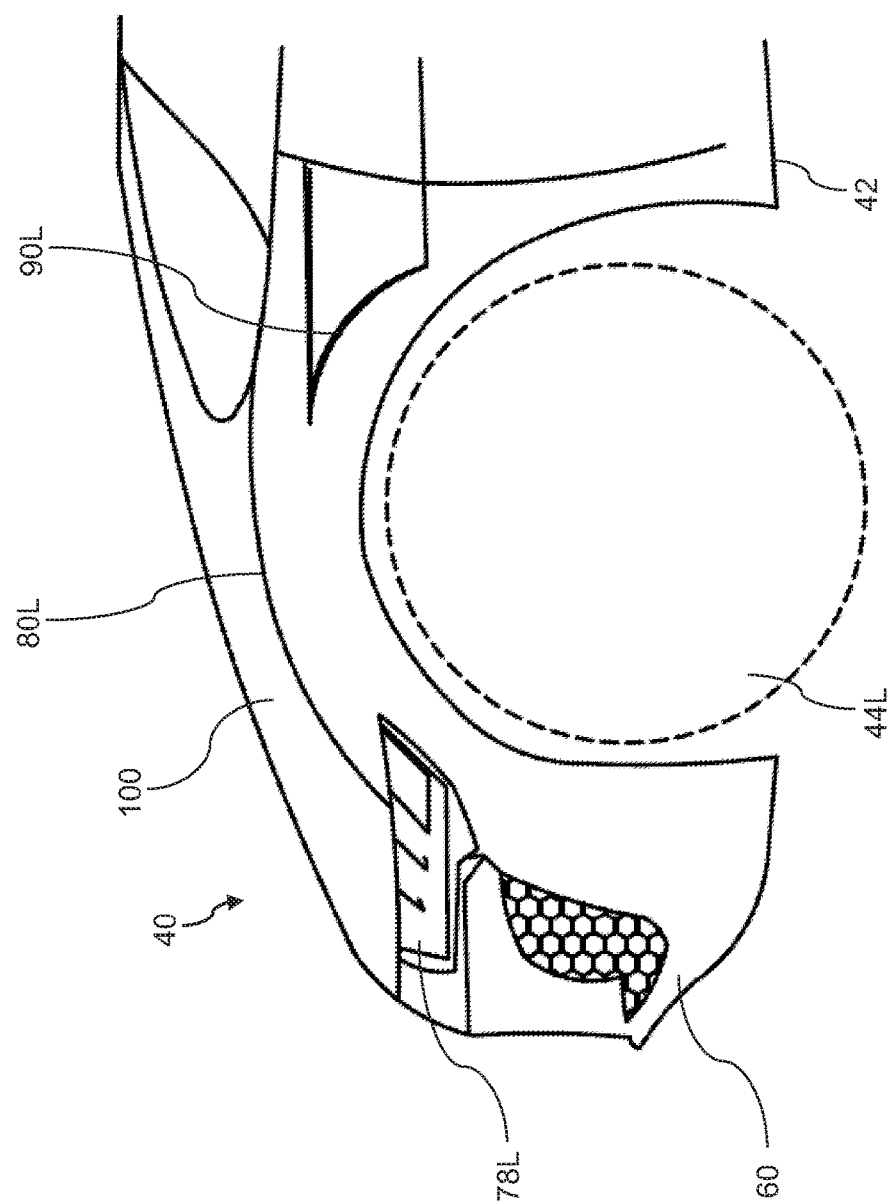
FIG. 6 is a perspective view of the front fender of the vehicle. As described above, the front fender can include the fender outlet.

FIG. 6 is a perspective view of the front fender 80L of the vehicle 40. As described above, the front fender 80L can include the fender outlet 90L. The fender outlet 90L can be arcuate and extend along the respective wheel arch. The fender outlet 90L can further be configured as a cutout in the front fender 80L with upper and lower edges to enhance channeling of airflow from the fender outlet 90L.

Figure 7:
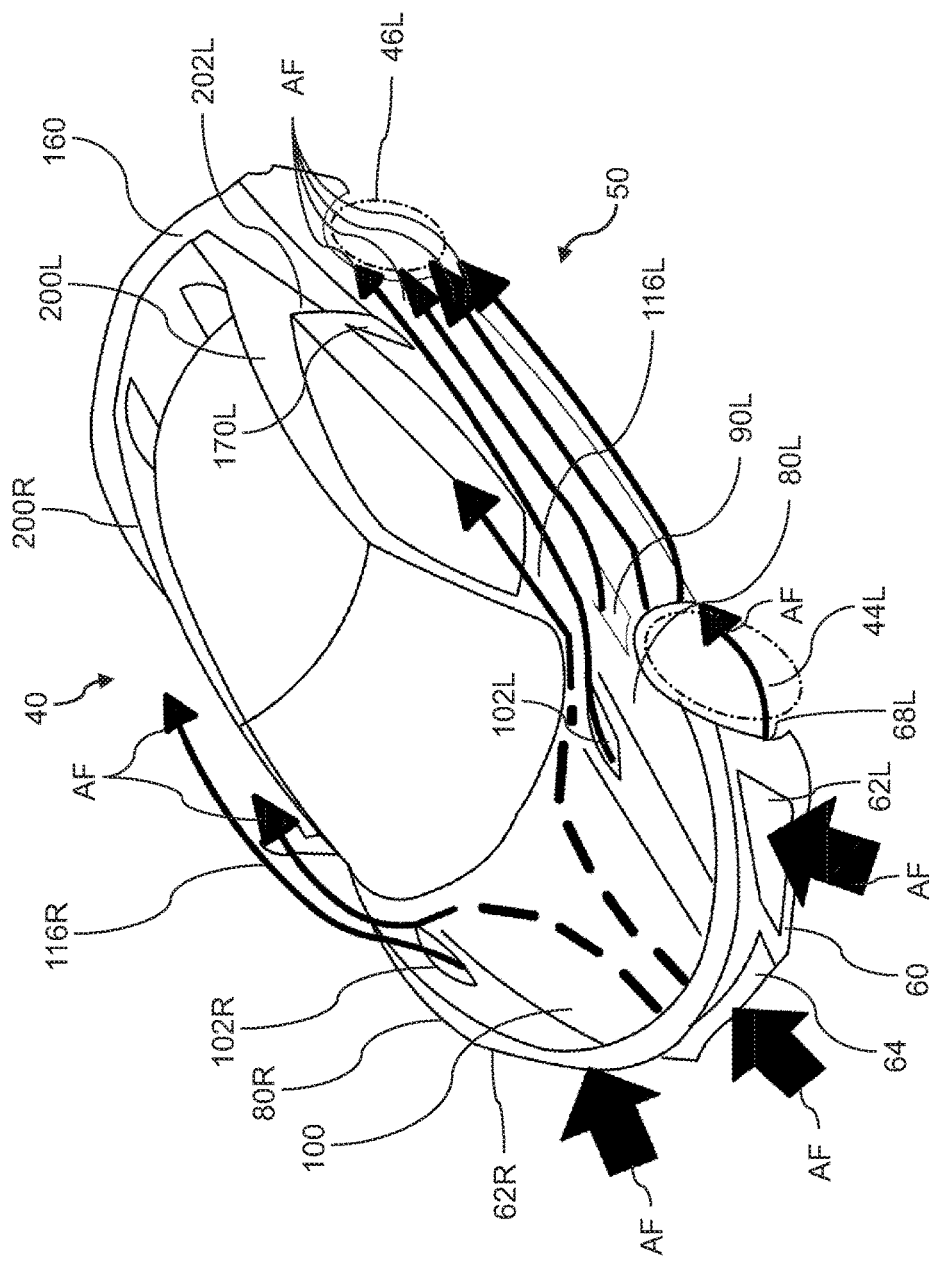
FIG. 7 is a perspective view of the exemplary vehicle having the aerodynamic system 50.

FIG. 7 is a perspective view of the exemplary vehicle 40 having the aerodynamic system 50. As shown in FIG. 7, the aerodynamic system 50 can include the front assembly 60, the hood 100, and the front fenders 80L,R in fluid communication with at least one of the heat exchangers 52 via the ducting assembly 180 of the vehicle 40 such that at least the hood outlets 102L,R, the wheel arch outlets 68L,R, and the fender outlets 90L,R vent airflow along through and over the body 42 for improved aerodynamic performance. Airflow can enter the lateral air inlets 62L,R and the central air inlet 64 of the front assembly 60 when the vehicle 40 is traveling in a forward direction. The side mirrors 116L,R can additionally be configured to guide airflow around the body 42 for improved aerodynamics.

Figure 8:
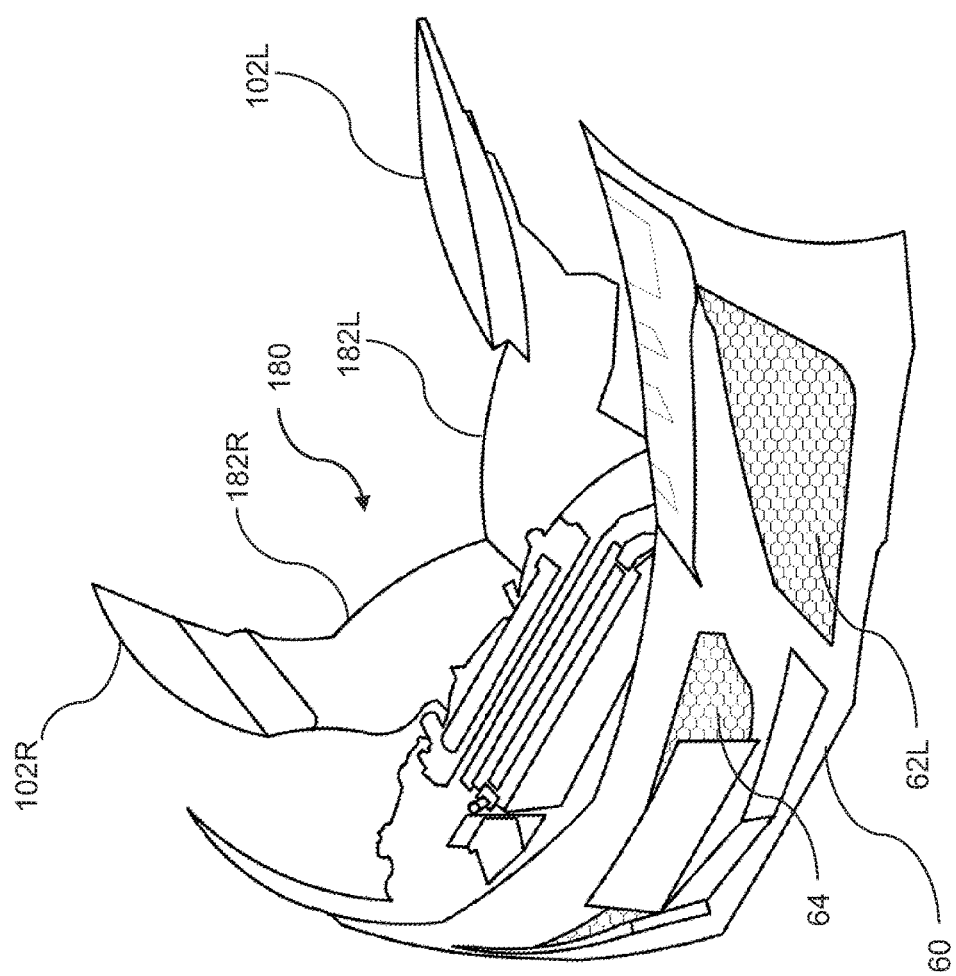
FIG. 8 is a perspective view of the front assembly connected to a front portion of the ducting assembly.

FIG. 8 is a perspective view of the front assembly 60 connected to a front portion of the ducting assembly 180. The front portion of the ducting assembly 180 shown in FIG. 8 is connected to a rear side of the front assembly 60 such that when the vehicle 40 travels in the forward direction, airflow passes through the front assembly 60 into the front portion of the ducting assembly 180.

The front portion of the ducting assembly 180 can include a pair of hood vent ducts 182L,R configured to channel airflow from the front assembly 60 to the hood outlets 102L,R. Airflow entering at least one of the lateral air inlets 62L,R and the central air inlet 64 can pass through the hood vent ducts 182L,R before exiting the ducting assembly 180 through the hood outlets 102L,R.

Figure 9:
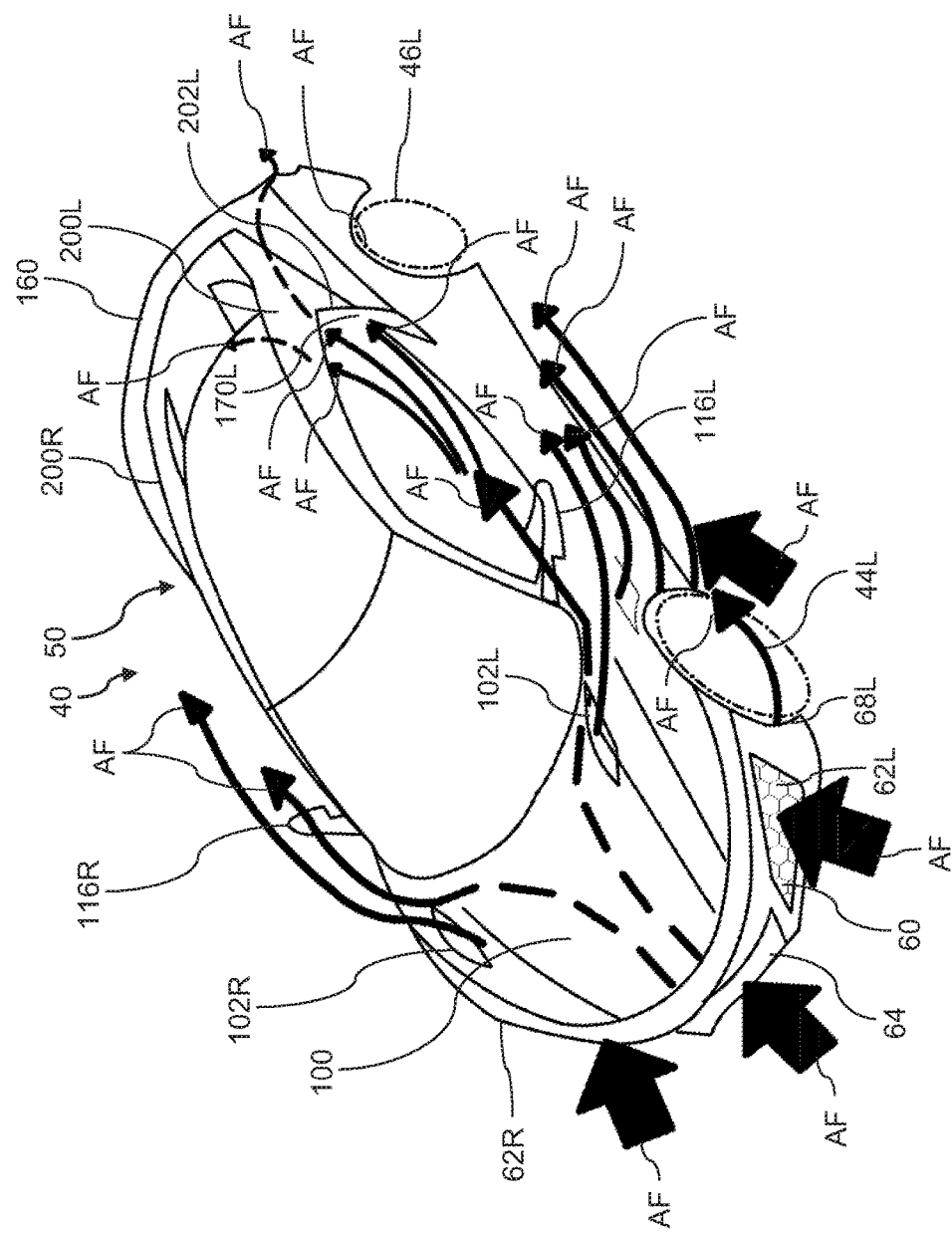
FIG. 9 is a perspective view of the exemplary vehicle having the aerodynamic system.

FIG. 9 is a perspective view of the exemplary vehicle 40 having the aerodynamic system 50. As shown in FIG. 9, the aerodynamic system 50 can include the front assembly 60, the hood 100, and the front fenders 80L,R in fluid communication with at least one of the heat exchangers 52 via the ducting assembly 180 of the vehicle 40 such that at least the hood outlets 102L,R, the wheel arch outlets 68L,R, and the fender outlets 90L,R vent airflow along through and over the body 42 for improved aerodynamic performance. Airflow can enter the lateral air inlets 62L,R and the central air inlet 64 of the front assembly 60 when the vehicle 40 is traveling in a forward direction. The side mirrors 116L,R can additionally be configured to guide airflow around the body 42 for improved aerodynamics.

In the present embodiment, the aerodynamic system 50 can guide airflow from the above described components along the sides of the body 42 to the pair of C-pillars 200L,R. Particularly, the aerodynamic system 50 can guide airflow from the ducting assembly 180 through the air passages extending between the body 42 and the raised C-pillars L,R. Airflow can also be guided into the rear air inlets 170L,R adjacent the pair of C-pillars 200L,R, the rear air inlets 170L,R configured to be in fluid communication with at least one of the heat exchangers 52 via the ducting assembly 180 of the vehicle 40. Airflow entering the rear air inlets 170L,R can be guided through a rear portion of the ducting assembly 180 to at least one of the rear slot assemblies 162L,R and the engine vents 222L,R.

Figure 10:
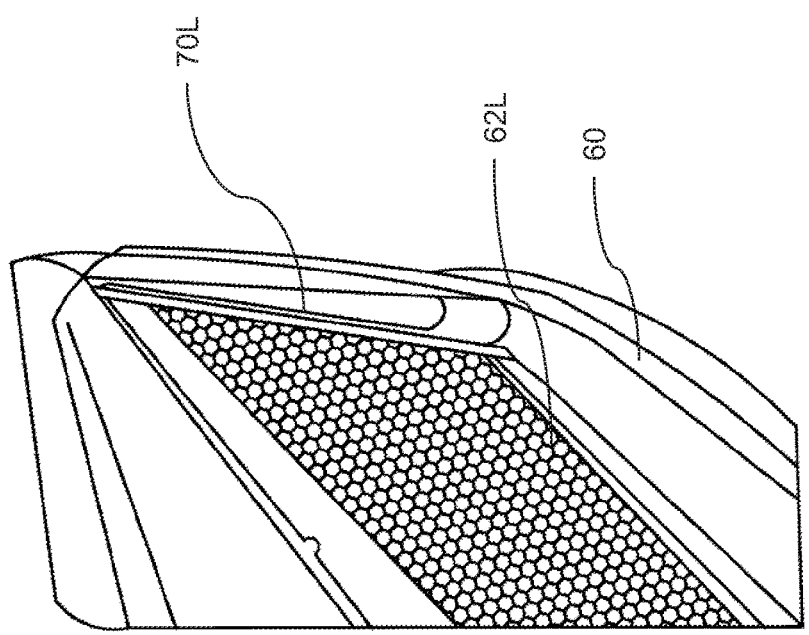
FIG. 10 is a partial perspective view of the front assembly including a wheel arch inlet in accordance with the disclosed subject matter.

FIG. 10 is a partial perspective view of the front assembly 60 including a wheel arch inlet 70L in accordance with the disclosed subject matter. The wheel arch inlet 70L can be configured to communicate with the corresponding wheel arch outlet 68L such that airflow may pass through an air passage formed therebetween.

The front assembly 60 of the present embodiment can include the wheel arch inlet 70 along a lower side portion of the front assembly 60 adjacent the wheel arch. Particularly, the wheel arch inlet 70L can be formed adjacent a rear edge of the lateral air inlet 62L and extend vertically along the rear edge. The wheel arch inlet 70L can further extend through the lower side portion of the front assembly 60 to join the wheel arch outlet 68L, thereby forming an air passage through the lower side portion. Airflow entering the wheel arch inlet 70L may then pass through the air passage to the wheel arch outlet 68L to be guided onto or around the wheel 44L to improve aerodynamic performance of the vehicle 40. Airflow exiting the wheel arch outlet 68L may also be guided onto a corresponding brake assembly 45L within the wheel 44L to provide cooling.

Figure 11:
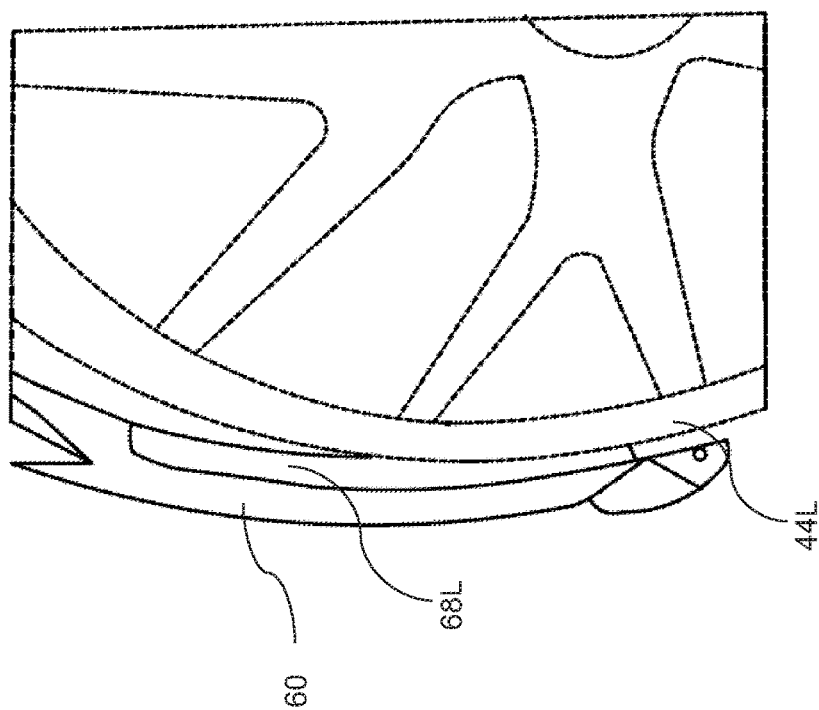
FIG. 11 is a partial perspective view of the front assembly and the wheel.

FIG. 11 is a partial perspective view of the front assembly 60 and the wheel 44L. As described above, the wheel arch outlet 68L can communicate with the wheel arch inlet 70L via the air passage extending therebetween to guide airflow from the front assembly 60 when the vehicle 40 is traveling in a forward direction onto or around the wheel 44L and the corresponding brake assembly 45L. The wheel arch outlet 68L can extend vertically along the wheel arch at the lower side portion of the front assembly 60.

Figure 12:
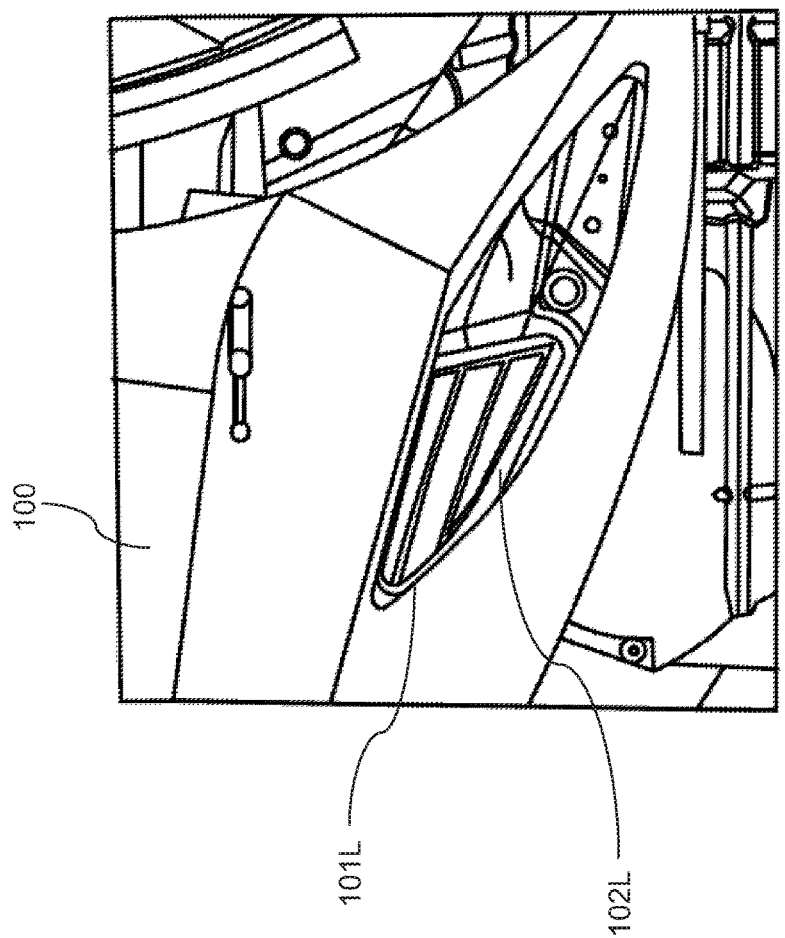
FIG. 12 is a partial perspective view of the hood of the vehicle including the hood outlet in accordance with the disclosed subject matter.
Figure 13:
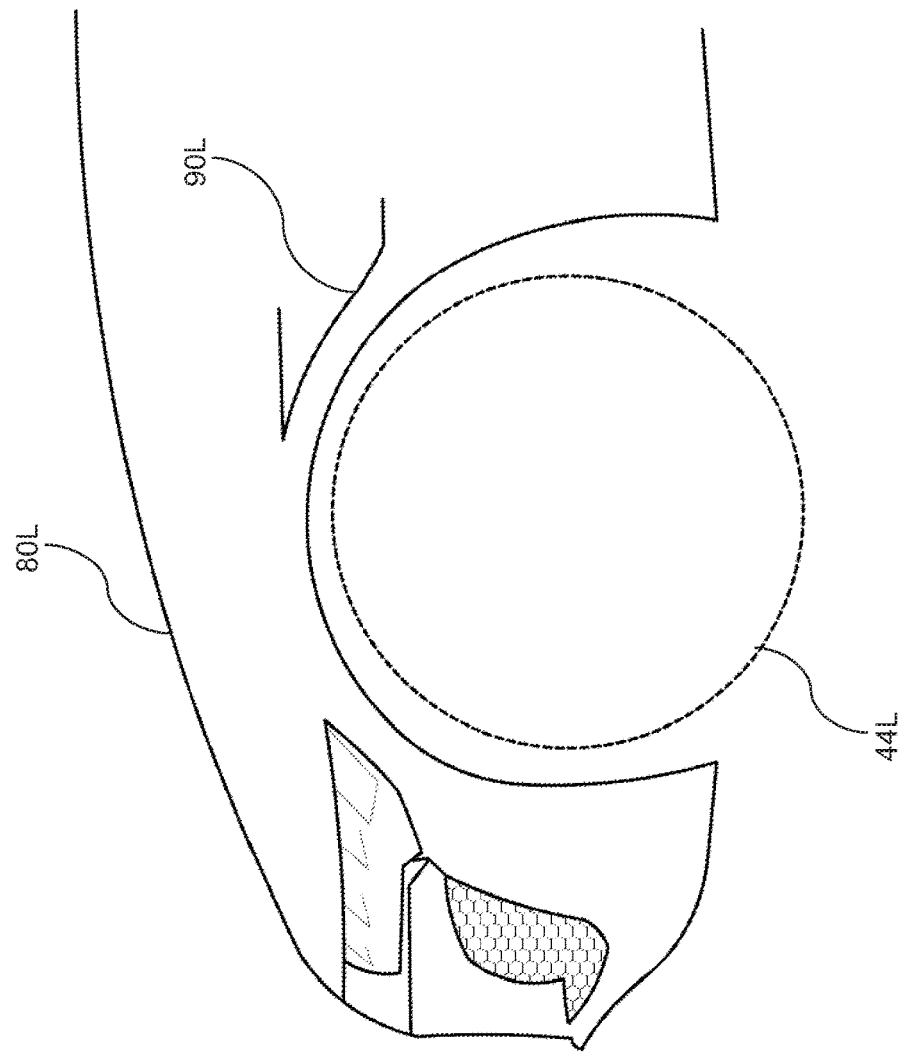
FIG. 13 is a perspective view of the wheel arch surrounding the wheel including the front fender.

FIG. 12 is a partial perspective view of the hood 100 of the vehicle 40 including the hood outlet 102L in accordance with the disclosed subject matter. The hood outlet 102L shown in FIG. 12 can be disposed at a rear side portion of the hood 100 proximate the front fender 80L and the windshield 140.

The hood outlet 102L can be configured as a vent for the ducting assembly 180, and specifically may exhaust airflow from the hood vent duct 182L. The hood outlet 102L can have an elongated opening corresponding to an elongated hood vent opening 101L extending through the hood 100. The hood vent opening 101L can be configured to align with the hood outlet 102L when the hood 100 is closed to facilitate passage of airflow to an exterior of the vehicle 40 through the hood 100.

Figure 14:
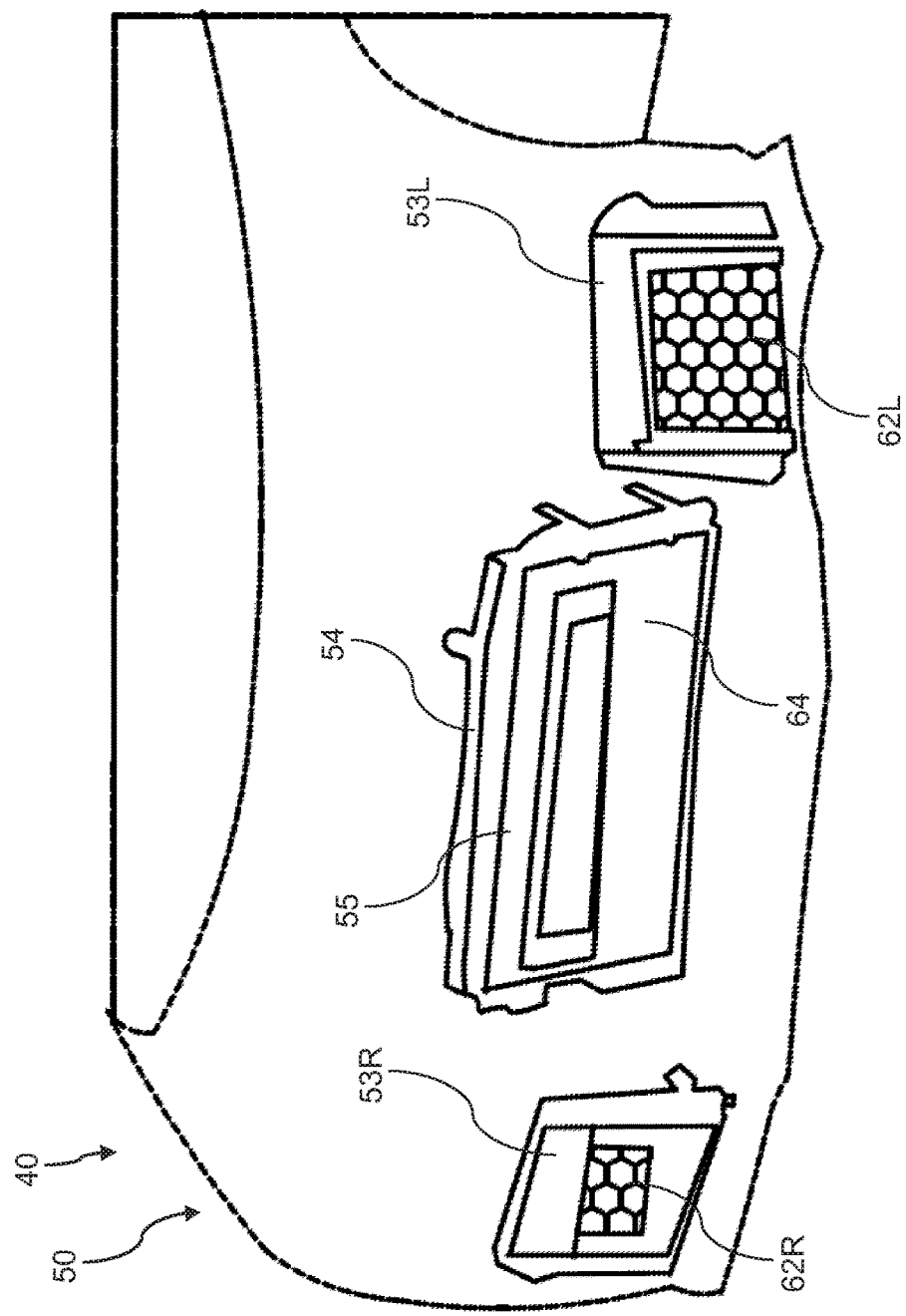
FIG. 14 is a partial perspective view of the vehicle including components to which at least one of the front assembly and the ducting assembly can guide airflow.

FIG. 14 is a partial perspective view of the vehicle 40 including components to which at least one of the front assembly 60 and the ducting assembly 180 can guide airflow. The components shown in FIG. 14 can include a main radiator, a condenser, a PDU cooler, a sub radiator, a DCT cooler, another sub radiator, an FDU cooler, an intercooler, another intercooler, an option clutch cooler, etc. Specifically, the pair of lateral air inlets 62L,R can guide airflow to a corresponding pair of side radiators 53L,R, while the central air inlet 64 can guide airflow to a PDU 55 and a center radiator 54.

Figure 15:
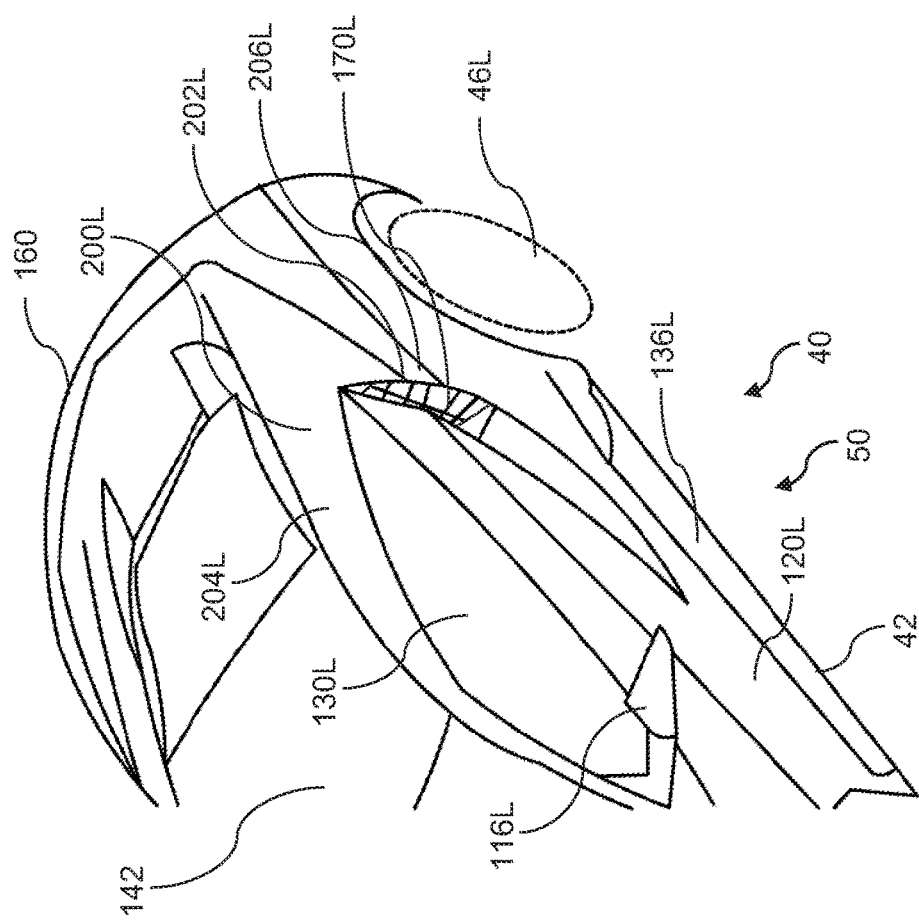
FIG. 15 is a partial perspective view of the rear assembly of the vehicle.

FIG. 15 is a partial perspective view of the rear assembly 160 of the vehicle 40. As shown in FIG. 15, the rear assembly 160 can include the rear air inlets 170L,R adjacent the respective C-pillars 200L,R. The rear air inlets 70L,R can be configured to guide airflow to at least one of an intercooler and a clutch cooler via the ducting assembly 180.

Figure 16:
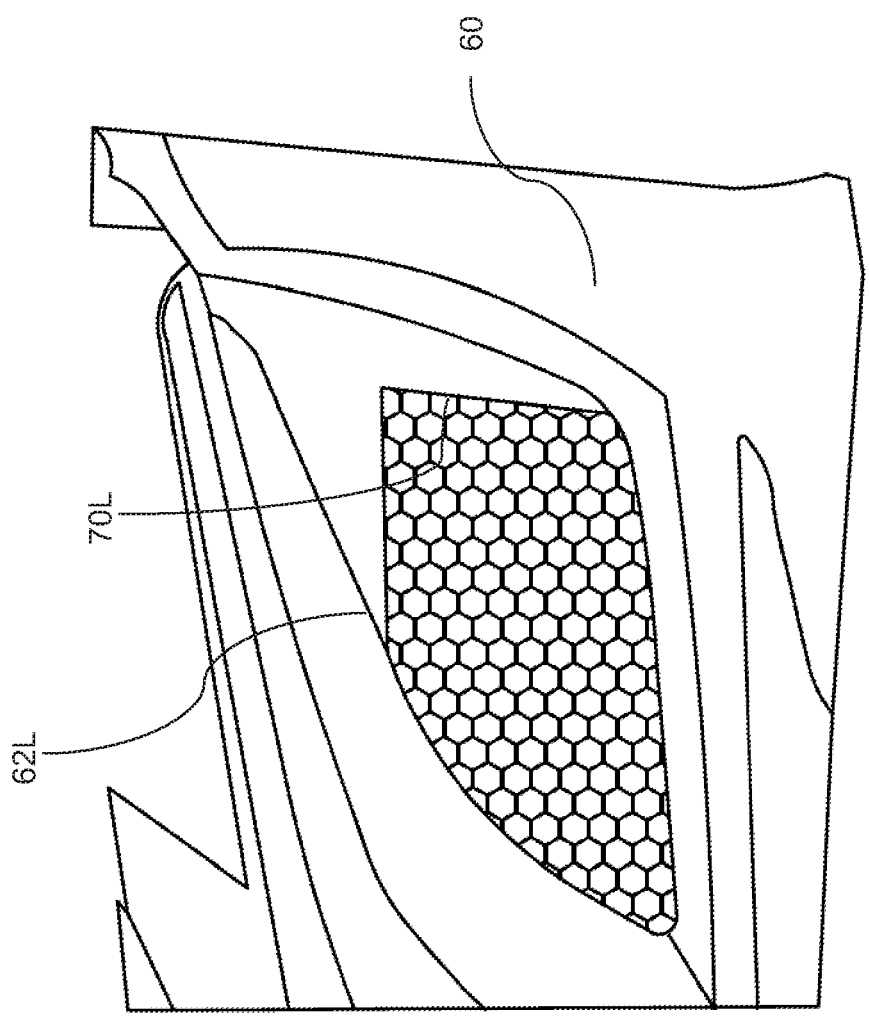
FIG. 16 is a partial perspective view of the front assembly including the lateral air inlet.

FIG. 16 is a partial perspective view of the front assembly 60 including the lateral air inlet 62L. The front assembly 60 shown in FIG. 16 can include the wheel arch inlet 70L formed behind the lateral air inlet 62L such that airflow through the lateral air inlet 62L can then pass into the wheel arch inlet 70L through the air passage to the wheel arch outlet 68L.

Figure 17:
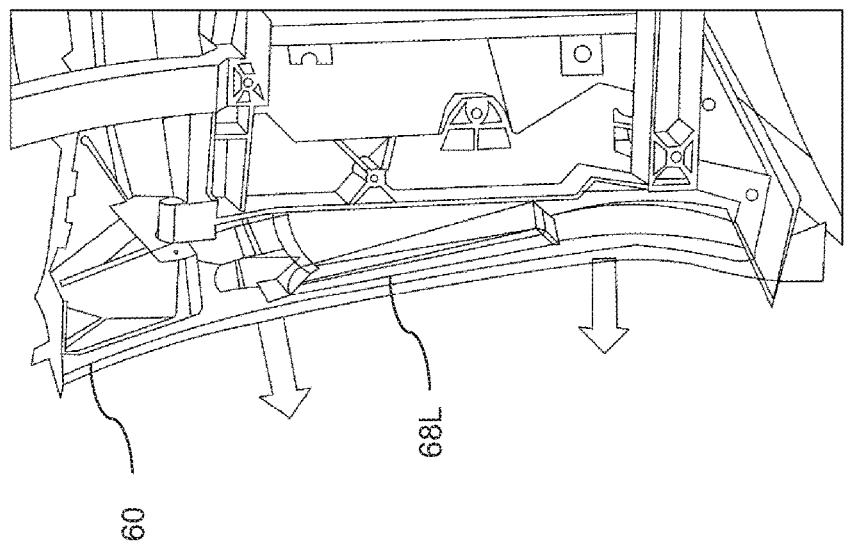
FIG. 17 is a partial perspective view of the lower side portion of the front assembly adjacent the wheel arch.

FIG. 17 is a partial perspective view of the lower side portion of the front assembly 60 adjacent the wheel arch. The lower side portion of the front assembly 60 can include the wheel arch outlet 68L as described above, the wheel arch outlet 68L extending along the lower portion of the wheel arch so as to guide airflow onto or around the wheel 44L and corresponding brake assembly 45L. The wheel arch outlet 68L can be disposed adjacent the side radiator 53L, and specifically a bulkhead of the side radiator 53L.

Figure 18:
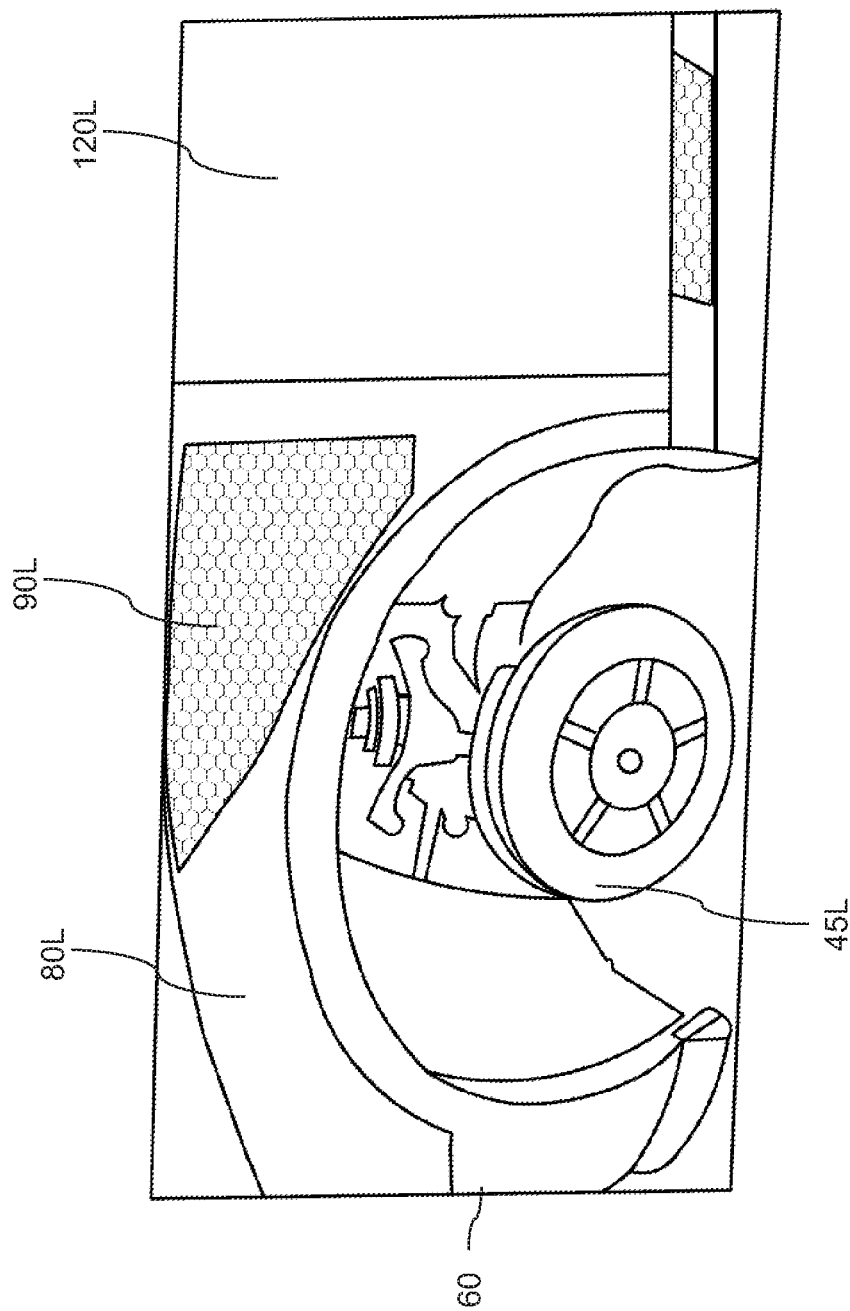
FIG. 18 is a perspective view of the front fender including the fender outlet.

FIG. 18 is a perspective view of the front fender 80L including the fender outlet 90L. The fender outlet 90L can be disposed along the wheel arch at a rear portion of the front fender 80L. The fender outlet 90L can include a mesh covering to prevent intrusion of foreign objects. The fender outlet 90L can be configured to vent airflow passing onto or around at least one of the wheel 44L and the brake assembly 45L.

Figure 19:
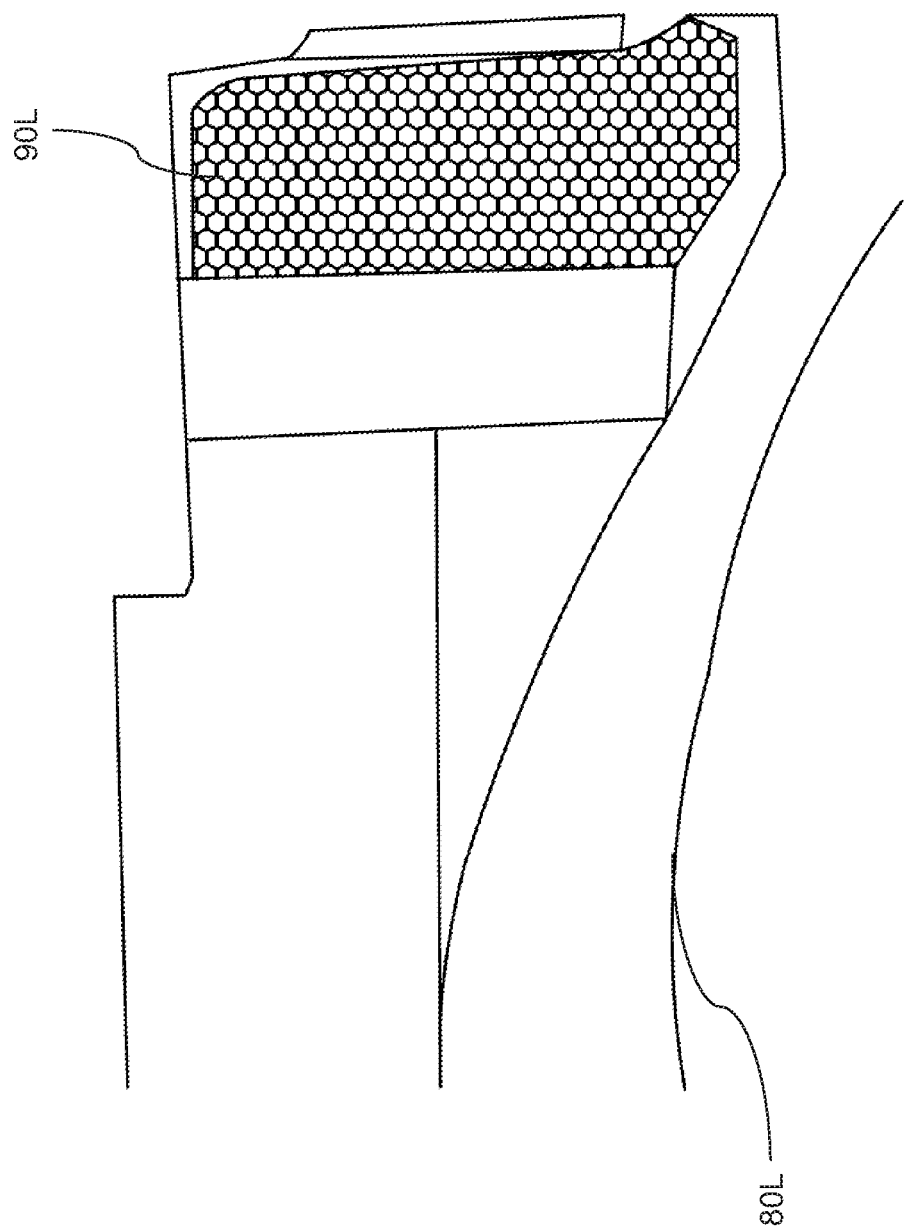
FIG. 19 is a perspective view of the fender outlet of the front fender.

FIG. 19 is a perspective view of the fender outlet 90L of the front fender 80L. The fender outlet 90L can be approximately rectangular extending vertically from the wheel arch at the rear portion of the front fender 80L.

Figure 20:
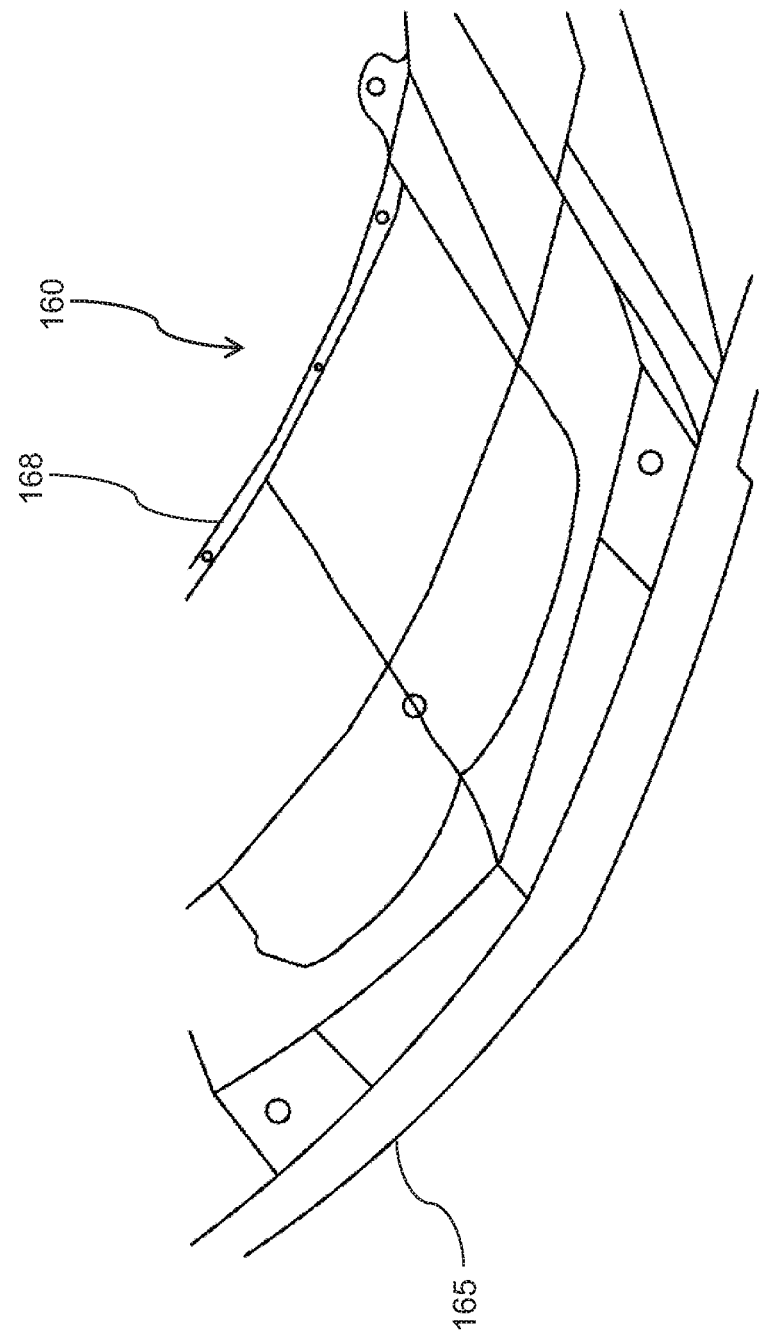
FIG. 20 is a perspective view of the decklid of the rear assembly.

FIG. 20 is a perspective view of the decklid 168 of the rear assembly 160. The decklid 168 shown in FIG. 20 can have the rear spoiler 165 disposed along a rear edge thereof, the rear spoiler 165 tracking the rear edge. The decklid 168 can have planar portions angled so as to form creases therebetween such that the planar portions and creases of the decklid 168 can improve aerodynamic performance of the vehicle 40.

Figure 21:
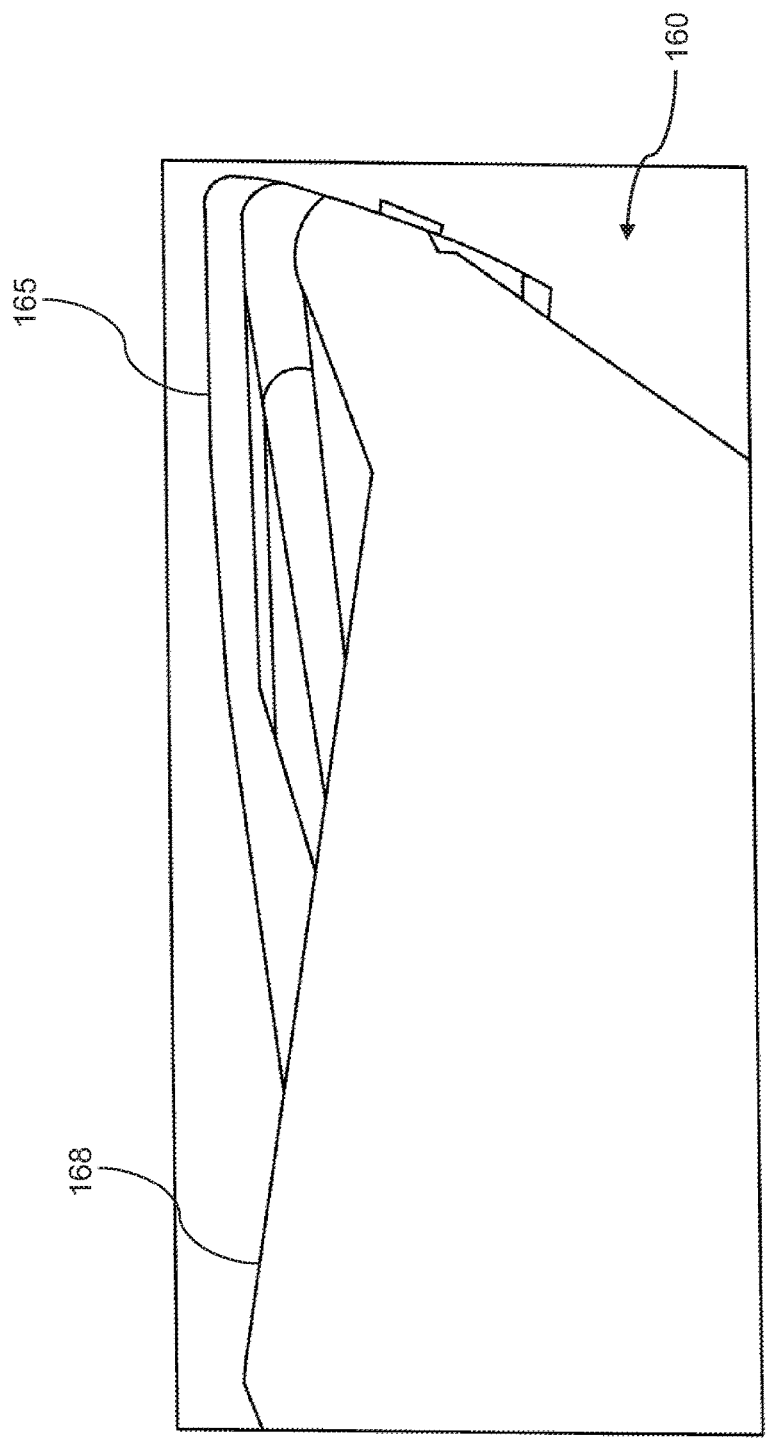
FIG. 21 is a cross-section view of the exemplary decklid of FIG. 20 in accordance with the disclosed subject matter.

FIG. 21 is a cross-section view of the exemplary decklid 168 of FIG. 20 in accordance with the disclosed subject matter. The decklid 168 and the rear spoiler 165 disposed thereon can be raised towards the rear of the rear assembly 160 to improve aerodynamic performance of the vehicle 40.

Figure 22:
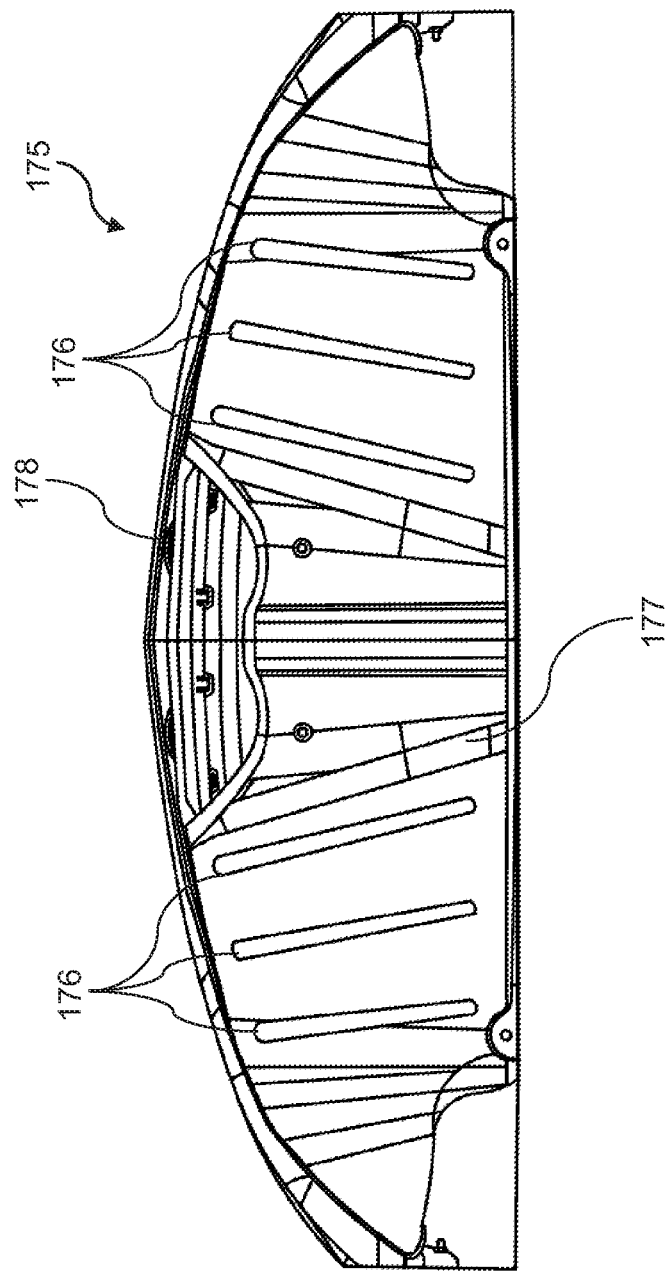
FIG. 22 is a perspective view of the rear diffuser of the rear assembly.

FIG. 22 is a perspective view of the rear diffuser 175 of the rear assembly 160. The rear diffuser 175 can have the plurality of vanes 176 disposed thereon, the vanes 176 extending from a front to a rear of the rear diffuser 175. The vanes 176 may be angled to guide airflow from underneath the vehicle 40 rearwards. The rear diffuser 175 can further be configured to include an exhaust channel 177 at a central portion, the exhaust channel 177 being contoured to extend around an exhaust system of the vehicle 40. The exhaust channel 177 can terminate at an exhaust opening 178 at a rearmost portion such that fumes from the exhaust system can flow rearwards of the vehicle 40 through the exhaust opening 178.

Figure 23:
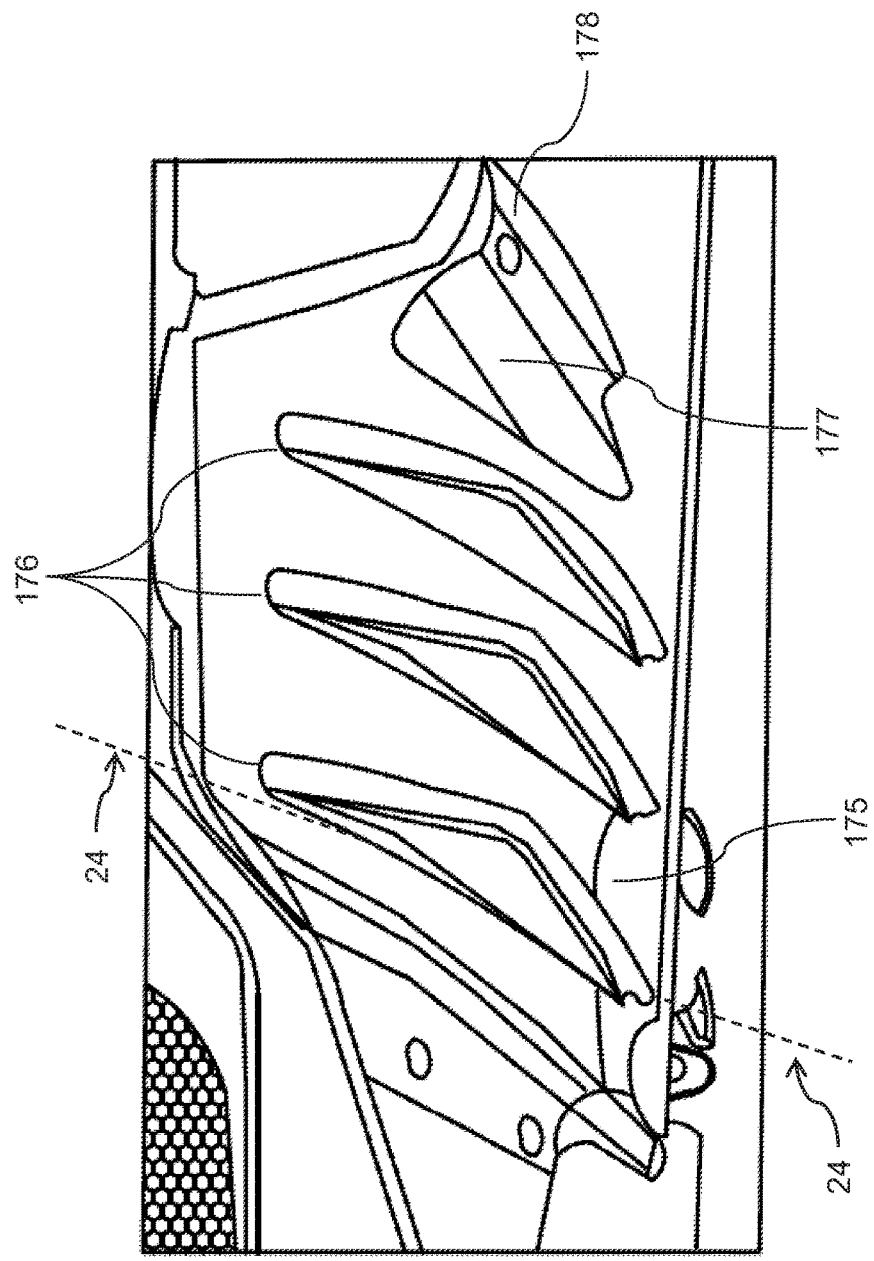
FIG. 23 is a partial perspective view of the rear diffuser including the vanes.

FIG. 23 is a partial perspective view of the rear diffuser 175 including the vanes 176. The vanes 176 can be approximately triangular in shape and serve as fins guiding airflow from underneath the vehicle 40 rearwards to improve aerodynamic performance. The vanes 176 may be curved to follow contours of the rear diffuser 175 to which the vanes 176 are connected.

Figure 24:
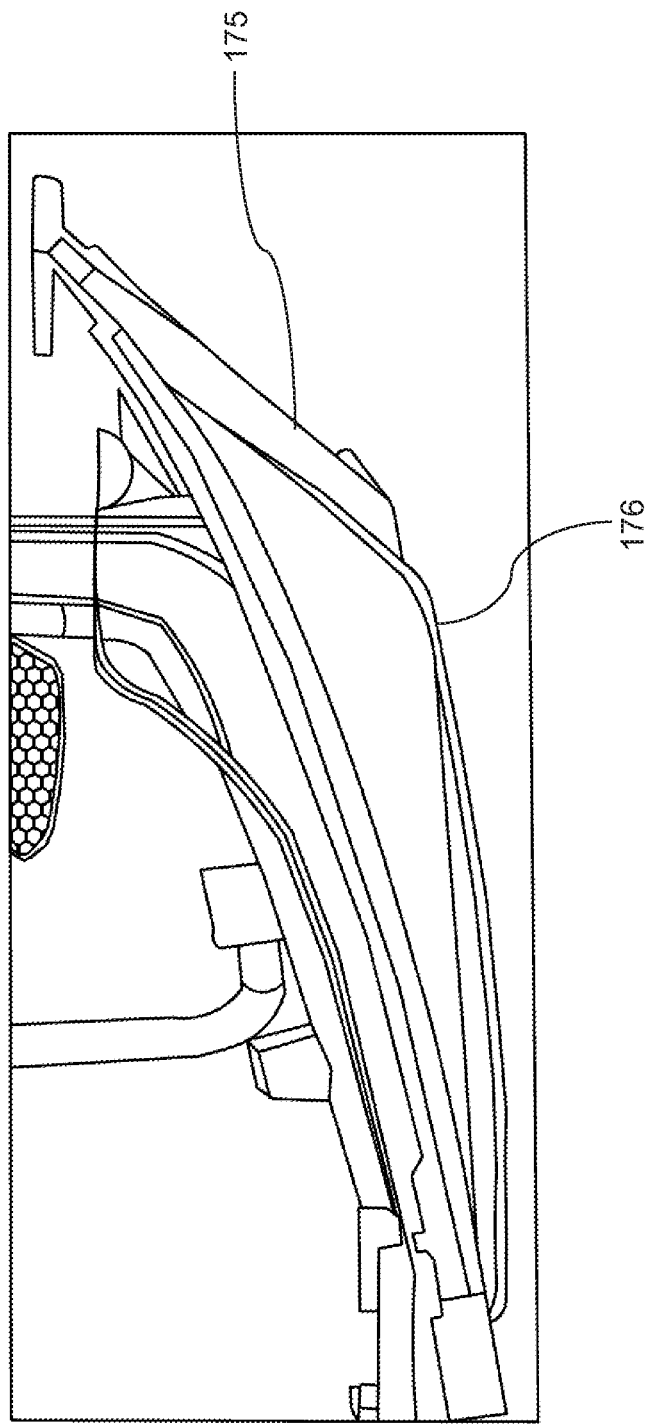
FIG. 24 is a cross-section view of the rear diffuser of FIG. 23.
Figure 25:
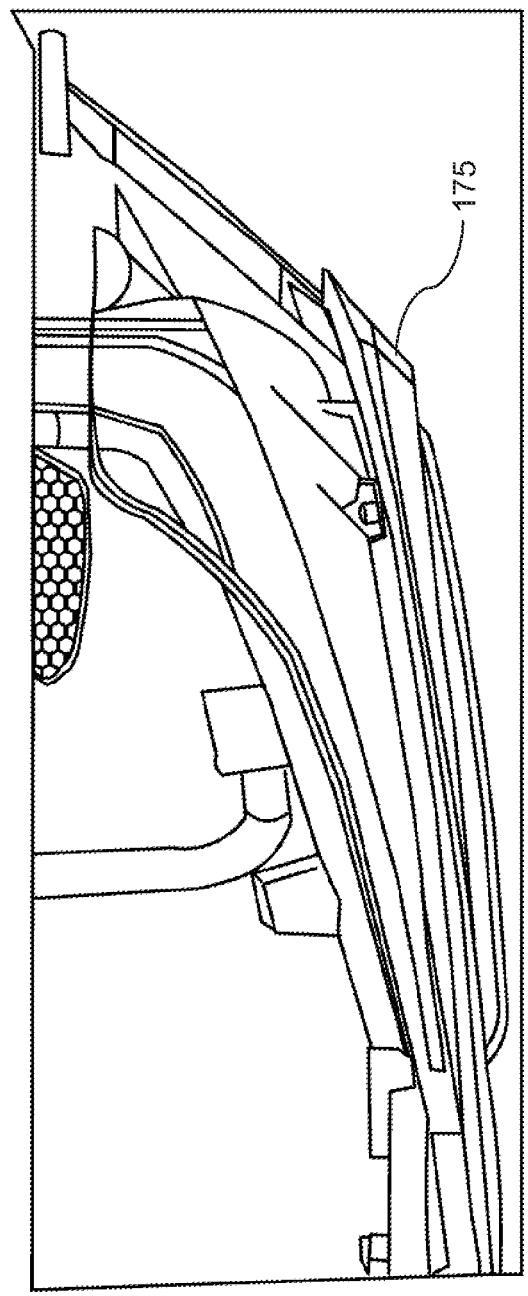
FIG. 25 is a perspective view of the rear diffuser of FIG. 24, the rear diffuser shown without the vanes.

FIG. 24 is a cross-section view of the rear diffuser 175 of FIG. 23. The rear diffuser 175 can includes the vanes 176 extending along a bottom surface thereof. The vanes 176 can increase in height from front to rear, providing increased surface area of the vanes 176 to improve aerodynamic performance of the vehicle 40.

Figure 26:
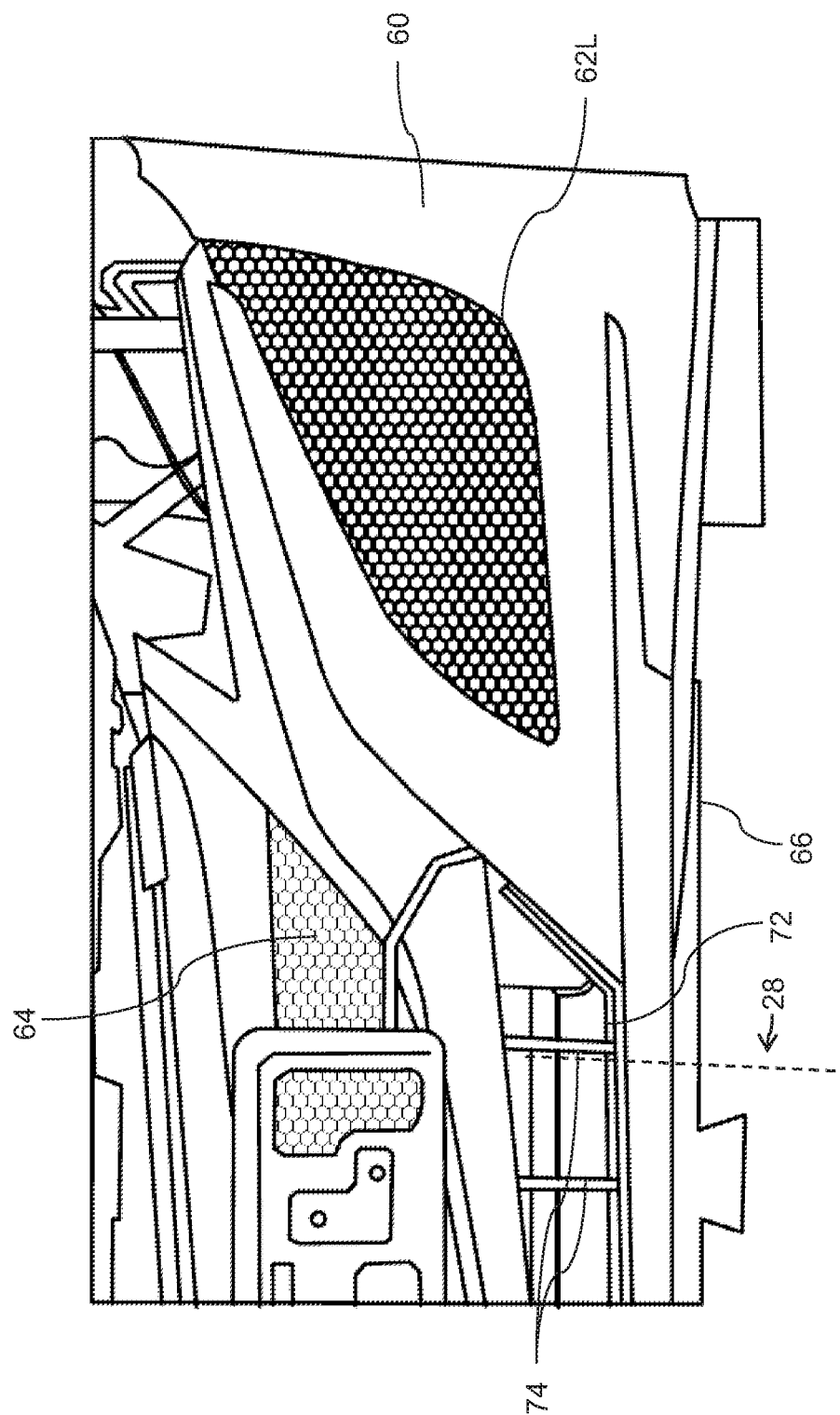
FIG. 26 is a partial perspective view of the front assembly of the vehicle.

FIG. 26 is a partial perspective view of the front assembly 60 of the vehicle 40. The front assembly 60 shown in FIG. 26 can include an air dam 72 disposed between the lateral air inlets 62L,R adjacent and above the chin spoiler 66. The air dam 72 can have vertical rakes 74 extending between a top and a bottom, the rakes 74 partitioning an opening in the air dam 72 extending underneath the central air vent 64. The rakes 74 can further be curved away from a centerline of the air dam 72 such that upper ends of each of the rakes 74 is disposed farther from the centerline than respective lower ends. The air dam 72 and the rakes 74 can be configured to be fluid communication with the ducting assembly 180 and provide improved aerodynamic performance of the vehicle 40.

Figure 27:
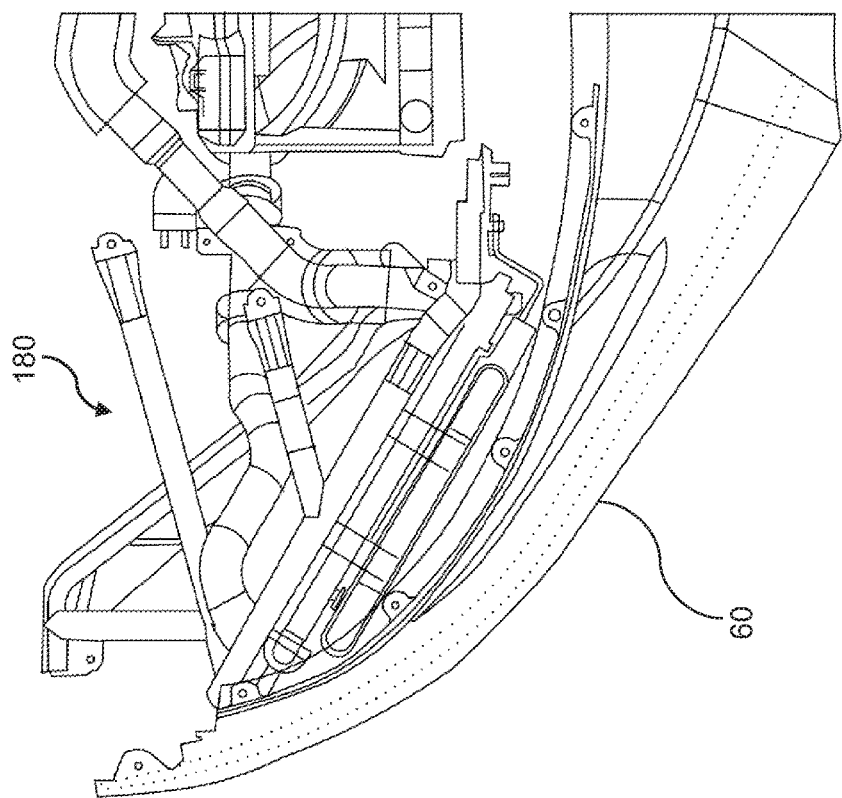
FIG. 27 is a partial perspective view of the ducting assembly attached to and in fluid communication with the front assembly.

FIG. 27 is a partial perspective view of the ducting assembly 180 attached to and in fluid communication with the front assembly 60. The ducting assembly 180 can include a plurality of hoses, pipes, channels, brackets, etc. configured to guide airflow from the front of the vehicle 40 to various other components such as at least one of the heat exchangers 52 while providing improved aerodynamic performance. Particularly, the ducting assembly 180 can guide airflow from inlets such as those within the front assembly 60 to cool components during and/or after operation, and then to outlets along the body 42.

Figure 28:
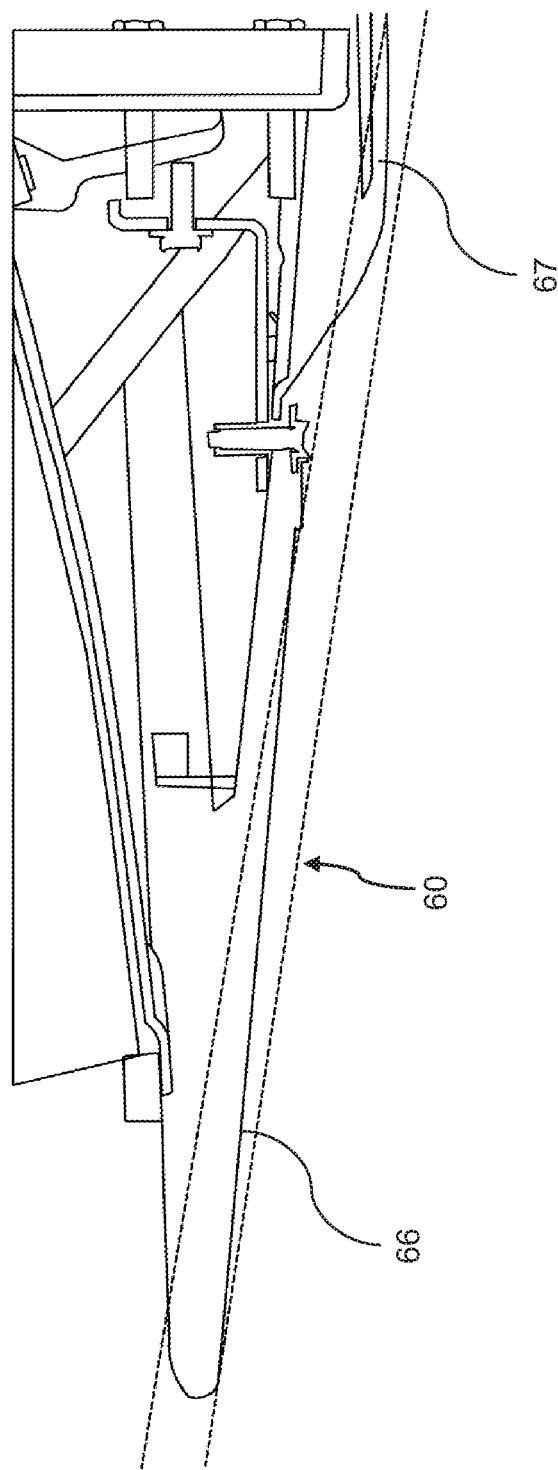
FIG. 28 is a cross-section view of the front assembly of FIG. 26 including the chin spoiler.

FIG. 28 is a cross-section view of the front assembly 60 of FIG. 26 including the chin spoiler 66. The chin spoiler 66 can extend a distance along a lower portion of the front assembly 60 to form approach angles of the vehicle 40. Specifically, the approach angles are defined by a distance forward the chin spoiler 66 extends from a splash shield 67 disposed along a bottom portion of the front assembly 60. The chin spoiler 66 can extend along the lower portion of the front assembly 60 to improve aerodynamic performance of the vehicle 40.

Figure 29:
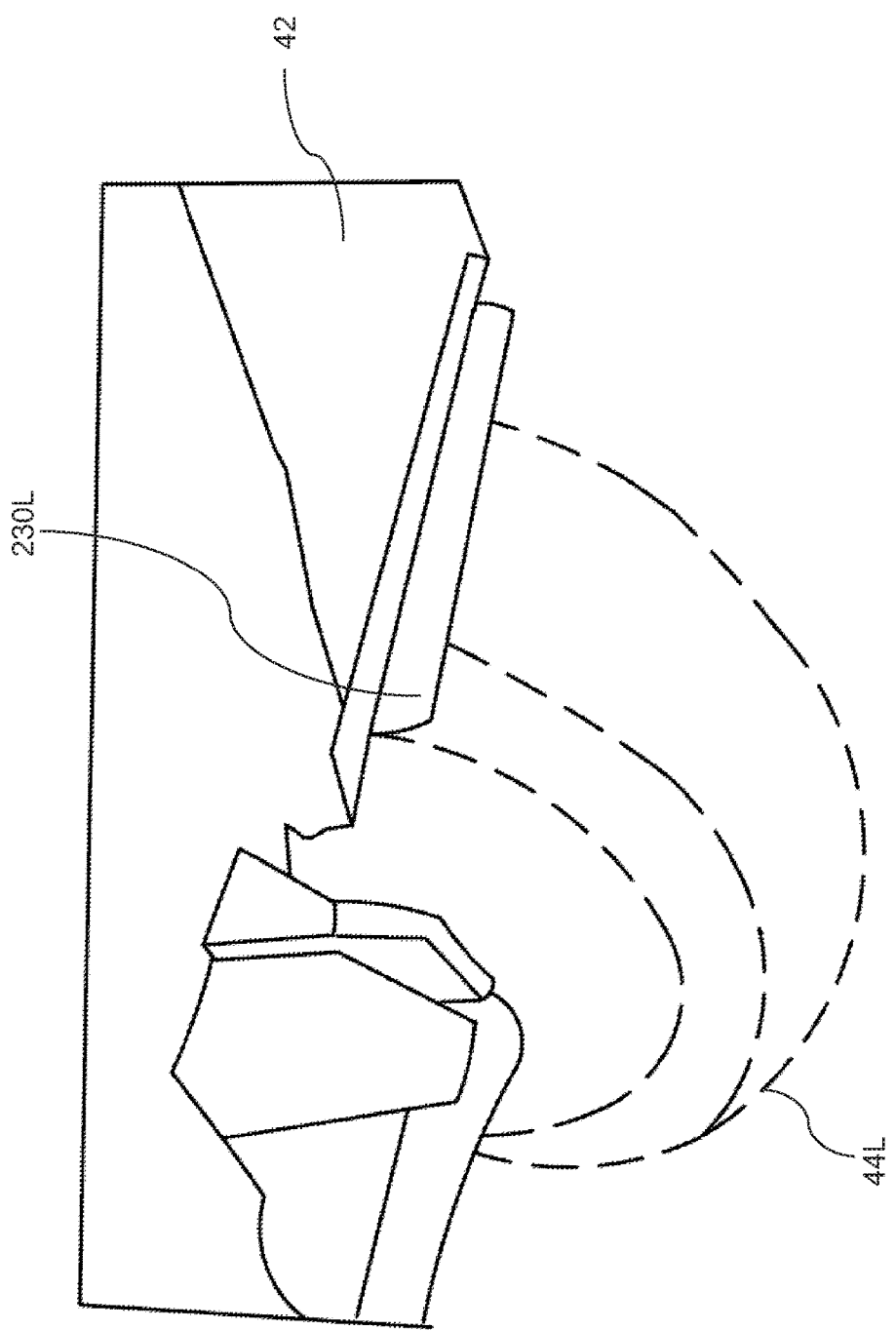
FIG. 29 is a perspective view of an underside of the body of the vehicle including a front wheel strake.
Figure 30:
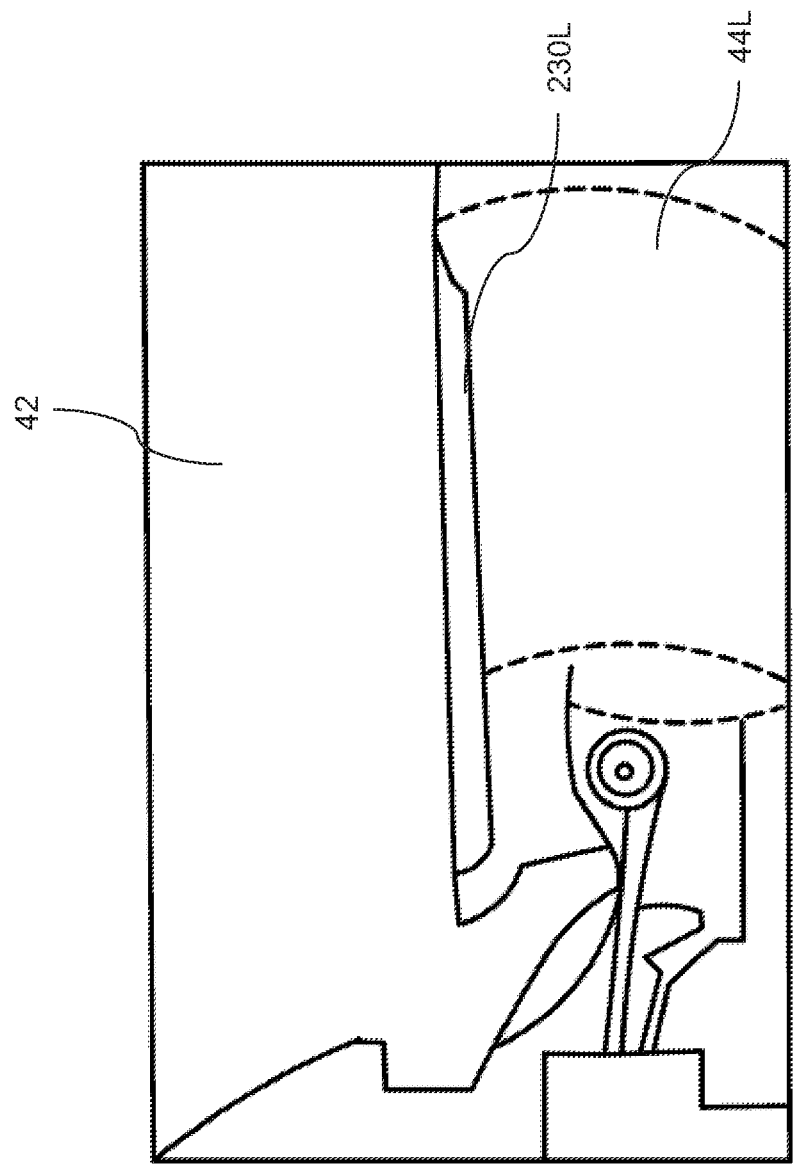
FIG. 30 is a perspective view of the front wheel strake of FIG. 29.

FIGS. 29 and 30 are perspective views of an underside of the body 42 of the vehicle 40 including a front wheel strake 230L. The front wheel strake 230L can be configured as a protrusion wedge extending along a width direction fore of the wheel 44L, a slope of the front wheel strake 230L facing forward towards airflow when the vehicle 40 is traveling in the forward direction. The front wheel strake 230L can be configured to guide airflow around the wheel 44L to improve aerodynamic performance of the vehicle 40.

Figure 31:
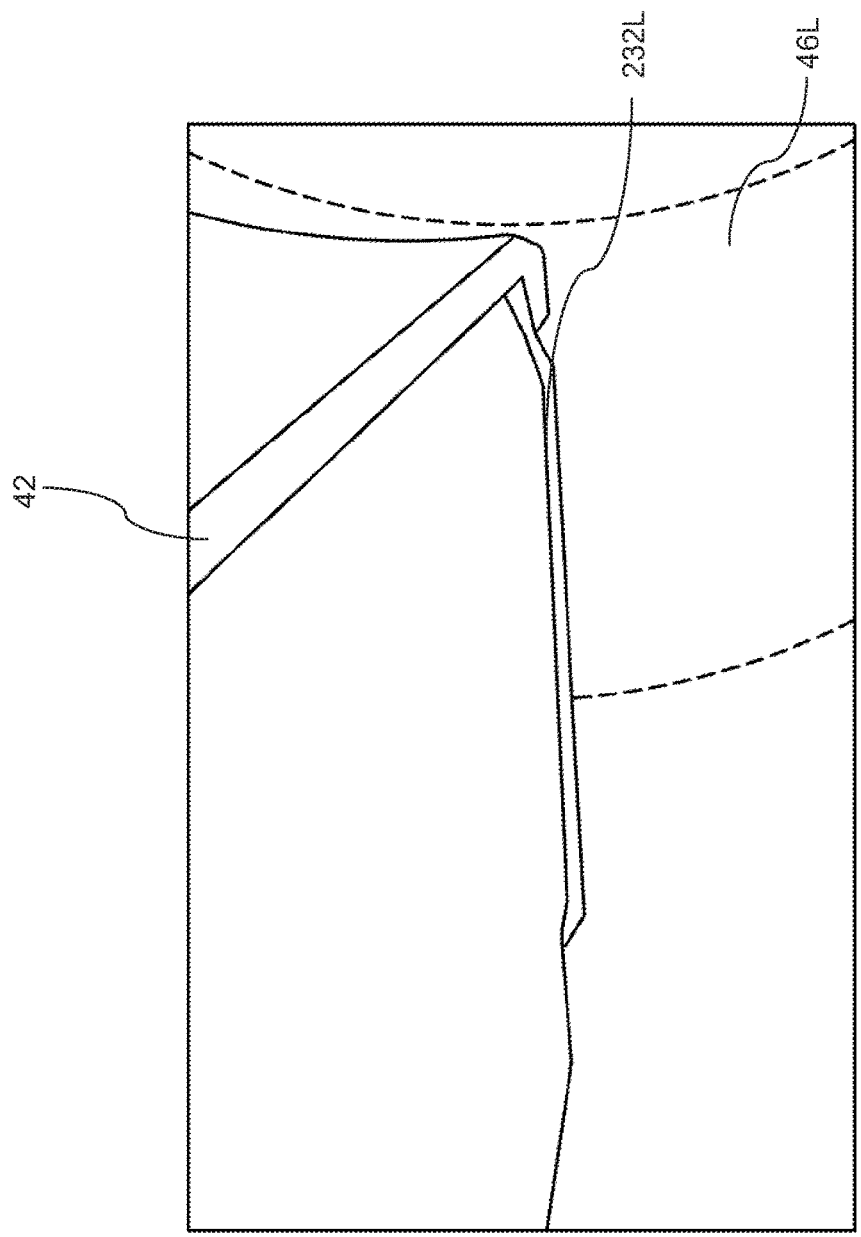
FIG. 31 is a perspective view of the underside of the body of the vehicle including a rear wheel strake.

FIG. 31 is a perspective view of the underside of the body 42 of the vehicle 40 including a rear wheel strake 232L. The rear wheel strake 232 can be configured as a protrusion or wedge extending along a width direction fore of the wheel 44L, a slope of the rear wheel strake 232 facing forward towards airflow when the vehicle 40 is traveling in the forward direction. The front wheel strake 230L can be configured to guide airflow around the wheel 46L to improve aerodynamic performance of the vehicle 40.

III. Alternative Embodiments

While certain embodiments of the invention are described above, and FIGS. 1-31 disclose the best mode for practicing the various inventive aspects, it should be understood that the invention can be embodied and configured in many different ways without departing from the spirit and scope of the invention.

For example, embodiments are disclosed above in the context of the aerodynamic system 50 of the vehicle 40 shown in FIGS. 1-31. However, embodiments are intended to include or otherwise cover any configuration of inlets, ducts, vents, fins, etc. for improving aerodynamic performance of a vehicle, as disclosed above.

As disclosed above, embodiments are intended to be used with any type of vehicle. The power source of the vehicle can be an internal combustion engine, an electric motor, or a hybrid of an internal combustion engine and an electric motor. The power source configured as an internal combustion engine or a hybrid power source can have the engine output axis oriented in the longitudinal direction or in the traverse direction of the vehicle. The engine can be mounted forward of the front axles, rearward of the rear axles, or intermediate the front and rear axles.

The vehicle can include any type of transmission, including an automatic transmission, a manual transmission, or a semi-automatic transmission. The transmission can include an input shaft, an output shaft, and a speed ratio assembly.

Embodiments are also intended to include or otherwise cover methods of using and methods of manufacturing any or all of the elements disclosed above. The methods of manufacturing include or otherwise cover processors and computer programs implemented by processors used to design various elements of the adjustable arm rest mechanism disclosed above.

While the subject matter has been described in detail with reference to exemplary embodiments thereof, it will be apparent to one skilled in the art that various changes can be made, and equivalents employed, without departing from the scope of the invention. All related art references discussed in the above Background section are hereby incorporated by reference in their entirety.

What is claimed is:

1. An aerodynamic system for a vehicle including a ducting assembly, the aerodynamic system comprising:
   a front assembly spaced forward of the vehicle;
   a pair of raised C-pillars spaced rearwardly from the front assembly, each of the C-pillars defining an air passage; and a rear assembly spaced rearwardly from the pair of raised C-pillars including an air inlet adjacent each of the pair of raised C-pillars, a rear spoiler, and a pair of rear slot assemblies adjacent the rear spoiler, the air inlets and the pair of rear slot assemblies configured to be in fluid communication with the ducting assembly, wherein the air inlets are configured to direct air flow from a front of the vehicle along a first air flow path and to exhaust from the pair of rear slot assemblies, and, the air passages are located above the air inlets and defined by the C-pillars and an exterior surface of the vehicle body such that air flow from a front of the vehicle into the air passages is directed over the vehicle body and onto the rear spoiler and defines a second air flow path that is separate and distinct from the first air flow path; and wherein each of the pair of rear slot assemblies is formed below an upper surface of the rear spoiler of the vehicle so as to be in fluid communication with the ducting assembly; and wherein each of the pair of rear slot assemblies extends adjacent to and through a portion of a rear spoiler.

2. The aerodynamic system according to claim 1, wherein each of the pair of C-pillars overlaps the corresponding air inlet of the rear assembly such that the air inlets are integrated within lower portions of the corresponding C-pillars.

3. The aerodynamic system according to claim 2, wherein each of the pair of air inlets is formed adjacent and below the air passage defined by the corresponding C-pillar.

4. The aerodynamic system according to claim 3, wherein each of the pair of air inlets and the air passage defined by the corresponding C-pillar are at least partially defined by a continuous outer surface of the corresponding C-pillar.

5. The aerodynamic system according to claim 1, wherein the air passages defined by the pair of raised C-pillars each extend between an inner surface of the corresponding C-pillar and an upper surface of the rear assembly, the upper surface configured as a deck lid.

6. The aerodynamic system according to claim 1, wherein each of the pair of raised C-pillars has an upper portion connected to and extending from the roof and a lower portion connected to and extending from the rear assembly such that the C-pillars span from the rear assembly to the roof, the upper and lower portion of each of the C-pillars are connected.

7. An aerodynamic system for a vehicle, the vehicle having a front end and a body that defines a roof, a rear assembly, and a ducting assembly, the aerodynamic system comprising:
 a first buttress extending from the roof to the rear assembly, the first buttress having a forward edge and defining an air passage with the body, the first buttress also including a lower portion that extends to the rear assembly and that defines a plurality of first intakes that are each contiguous with the ducting assembly;
 a first fin disposed adjacent to the first buttress and configured to project toward the front end of the vehicle from the forward edge of the first buttress so as to direct airflow from an exterior of the vehicle body to at least one of the plurality of first intakes;
 a second buttress extending from the roof to the rear assembly, such that the first buttress and the second buttress are disposed along opposing sides of the body, the second buttress having a forward edge and defining an air passage with the body, the second buttress also including a lower portion that extends to the rear assembly and that defines a plurality of second intakes that are each contiguous with the ducting assembly; and
 a second fin disposed adjacent to the second buttress and configured to project toward the front end of the vehicle from the forward edge of the second buttress so as to direct airflow from the exterior of the vehicle body to at least one of the plurality of second intakes defined by the lower portion of the second buttress.

8. The aerodynamic system according to claim 7, wherein the plurality of first intakes includes two intakes and the first fin is configured to direct airflow from the exterior of the vehicle body to the two intakes.

9. The aerodynamic system according to claim 7, wherein the first buttress is approximately V-shaped such that the forward edge includes an upper edge angled from a lower edge, the first fin being disposed adjacent the upper edge.

10. The aerodynamic system according to claim 7, wherein a lower portion of the first fin is adjacent one of the plurality of first intakes nearest the roof.

11. The aerodynamic system according to claim 7, wherein the first fin is attached to an inner surface of the first buttress facing the air passage.

* * * * *